(12) United States Patent
Gizdarski

(10) Patent No.: US 10,380,303 B2
(45) Date of Patent: Aug. 13, 2019

(54) POWER-AWARE DYNAMIC ENCODING

(71) Applicant: SYNOPSYS, INC., Mountain View, CA (US)

(72) Inventor: Emil Gizdarski, Cupertino, CA (US)

(73) Assignee: Synopsys, Inc., Mountain View, CA (US)

(*) Notice: Subject to any disclaimer, the term of this patent is extended or adjusted under 35 U.S.C. 154(b) by 55 days.

(21) Appl. No.: 14/954,391

(22) Filed: Nov. 30, 2015

(65) Prior Publication Data

US 2017/0154132 A1   Jun. 1, 2017

(51) Int. Cl.
| | |
|---|---|
| *G06F 17/50* | (2006.01) |
| *G01R 31/00* | (2006.01) |
| *G01R 31/26* | (2014.01) |
| *G01R 31/317* | (2006.01) |
| *G01R 31/3183* | (2006.01) |
| *G01R 31/3185* | (2006.01) |

(52) U.S. Cl.
CPC ......... *G06F 17/505* (2013.01); *G01R 31/26* (2013.01); *G01R 31/31718* (2013.01); *G01R 31/318335* (2013.01); *G01R 31/318555* (2013.01); *G06F 17/5022* (2013.01); *G06F 17/5081* (2013.01); *G01R 31/31704* (2013.01); *G01R 31/318547* (2013.01); *G01R 31/318583* (2013.01); *G06F 17/5045* (2013.01); *G06F 2217/14* (2013.01); *G06F 2217/78* (2013.01)

(58) Field of Classification Search
None
See application file for complete search history.

(56) References Cited

U.S. PATENT DOCUMENTS

| | | |
|---|---|---|
| 3,784,907 A | 1/1974 | Eichelberger |
| 4,495,629 A | 1/1985 | Zasio et al. |
| 4,503,537 A | 3/1985 | McAnney |
| 5,790,562 A | 8/1998 | Murray et al. |
| 6,158,032 A | 12/2000 | Currier et al. |
| 6,327,687 B1 | 12/2001 | Rajski et al. |
| 6,557,129 B1 | 4/2003 | Rajski et al. |
| 6,615,380 B1 | 9/2003 | Kapur et al. |
| 6,684,109 B1 | 1/2004 | Osypka |
| 6,701,505 B1 | 3/2004 | Srinivasan |

(Continued)

OTHER PUBLICATIONS

N. Sitchinava et al., "Changing the Scan Enable during Shift," Proc. of the $22^{nd}$ IEEE VLSI Test Symposium (VTS 2004), 6 pages.*

(Continued)

*Primary Examiner* — Leigh M Garbowski
(74) *Attorney, Agent, or Firm* — Haynes Beffel & Wolfeld LLP; Warren S. Wolfeld

(57) ABSTRACT

Dynamic power-aware encoding method and apparatus is presented based on a various embodiments described herein. The experimental results confirmed that a desirable reduction in the toggling rate in the decompressed test stimulus is achievable by reasonable overhead (ATPG time, hardware overhead and pattern inflation) typically without degradation of a compression ratio. The performed experimental evaluation confirms that the described embodiments can support aggressive scan compression, efficient dynamic pattern compaction and a reduction of toggling rate in the decompressed test stimulus.

16 Claims, 17 Drawing Sheets

(56) References Cited

U.S. PATENT DOCUMENTS

| | | | |
|---|---|---|---|
| 6,708,192 B2 | 3/2004 | Rajski et al. | |
| 6,738,939 B2 | 5/2004 | Udawatta et al. | |
| 6,745,359 B2 | 6/2004 | Nadeau-Dostie | |
| 6,748,564 B1 | 6/2004 | Cullen et al. | |
| 6,782,501 B2 | 8/2004 | Distler et al. | |
| 6,807,646 B1 | 10/2004 | Williams et al. | |
| 6,829,740 B2 | 12/2004 | Rajski et al. | |
| 6,874,109 B1 | 3/2005 | Rajski et al. | |
| 6,877,119 B2 | 4/2005 | Lauga | |
| 7,058,869 B2 | 6/2006 | Abdel-Hafez et al. | |
| 7,111,209 B2 | 9/2006 | Rajski et al. | |
| 7,155,648 B2 | 12/2006 | Jas et al. | |
| 7,231,570 B2 | 6/2007 | Wang et al. | |
| 7,278,075 B2 | 10/2007 | Onodera | |
| 7,278,123 B2 | 10/2007 | Ravi et al. | |
| 7,370,254 B2 | 5/2008 | Rajski et al. | |
| 7,415,678 B2 | 8/2008 | Gizdarski | |
| 7,487,420 B2 | 2/2009 | Keller | |
| 7,500,163 B2 | 3/2009 | Rajski et al. | |
| 7,509,550 B2 | 3/2009 | Rajski et al. | |
| 7,584,392 B2 | 9/2009 | Bhatia | |
| 7,590,905 B2 | 9/2009 | Abdel-Hafez et al. | |
| 7,716,548 B2 | 5/2010 | Cheng et al. | |
| 7,729,884 B2 | 6/2010 | Huang et al. | |
| 7,743,302 B2 | 6/2010 | Rajski et al. | |
| 7,882,409 B2 | 2/2011 | Gizdarski | |
| 7,890,827 B2 | 2/2011 | Rajski et al. | |
| 7,925,465 B2 * | 4/2011 | Lin | G01R 31/318575 702/124 |
| 7,925,947 B1 | 4/2011 | Touba et al. | |
| 7,937,634 B2 * | 5/2011 | Almukhaizim | G06F 11/267 714/726 |
| 7,949,269 B2 | 5/2011 | Takeuchi | |
| 7,949,921 B2 | 5/2011 | Gizdarski | |
| 7,956,772 B2 | 6/2011 | Shokrollahi et al. | |
| 7,962,822 B2 * | 6/2011 | Wen | G01R 31/318502 714/726 |
| 7,996,741 B2 | 8/2011 | Touba et al. | |
| 8,046,653 B2 | 10/2011 | Rajski et al. | |
| 8,103,926 B2 | 1/2012 | Gizdarski | |
| 8,166,359 B2 | 4/2012 | Rajski et al. | |
| 8,290,738 B2 * | 10/2012 | Lin | G01R 31/318575 702/124 |
| 8,301,945 B2 | 10/2012 | Rajski et al. | |
| 8,407,541 B1 | 3/2013 | Teh et al. | |
| 8,499,209 B2 | 7/2013 | Rajski et al. | |
| 8,566,656 B2 | 10/2013 | Zivkovic et al. | |
| 8,707,227 B2 | 4/2014 | Gizdarski | |
| 8,898,529 B2 * | 11/2014 | Goessel | G01R 31/318547 714/729 |
| 8,914,695 B2 * | 12/2014 | Gizdarski | G01R 31/318547 377/72 |
| 8,914,965 B2 * | 12/2014 | Shibata | B23B 5/02 29/557 |
| 9,088,522 B2 * | 7/2015 | Rajski | G01R 31/318335 |
| 9,134,378 B2 * | 9/2015 | Gizdarski | G01R 31/318547 |
| 9,702,934 B1 | 7/2017 | Meehl et al. | |
| 10,120,029 B2 * | 11/2018 | Rajski | G01R 31/318575 |
| 2002/0093356 A1 | 7/2002 | Williams et al. | |
| 2003/0056164 A1 | 3/2003 | Lauga | |
| 2004/0139377 A1 | 7/2004 | Barnhart et al. | |
| 2004/0148554 A1 | 7/2004 | Dervisoglu et al. | |
| 2004/0230884 A1 | 11/2004 | Rajski et al. | |
| 2005/0055617 A1 | 3/2005 | Wang et al. | |
| 2005/0060625 A1 | 3/2005 | Wang et al. | |
| 2005/0097413 A1 | 5/2005 | Ravi et al. | |
| 2005/0138509 A1 | 6/2005 | Kiryu et al. | |
| 2005/0229123 A1 | 10/2005 | Wang et al. | |
| 2007/0113135 A1 | 5/2007 | Rajski et al. | |
| 2007/0234157 A1 | 10/2007 | Rajski et al. | |
| 2008/0133987 A1 | 6/2008 | Rajski et al. | |
| 2008/0294953 A1 | 11/2008 | Cheng et al. | |
| 2009/0259900 A1 | 10/2009 | Rajski et al. | |
| 2009/0300446 A1 | 12/2009 | Rajski et al. | |
| 2010/0205492 A1 | 8/2010 | Sinanoglu | |
| 2010/0229060 A1 | 9/2010 | Mrugalski et al. | |
| 2010/0257417 A1 | 10/2010 | Rajski et al. | |
| 2010/0306609 A1 | 12/2010 | Rajski et al. | |
| 2011/0258503 A1 | 10/2011 | Wohl et al. | |
| 2012/0239995 A1 | 9/2012 | Gizdarski | |
| 2012/0311009 A1 | 12/2012 | Jarrett et al. | |
| 2015/0323597 A1 * | 11/2015 | Rajski | G01R 31/3177 714/727 |

OTHER PUBLICATIONS

E. Gizdarski, "Two-Step Dynamic Encoding for Linear Decompressors," 2014 IEEE 23$^{rd}$ Asian Test Symposium, Nov. 16-19, 2014, pp. 330-335.*

C.V. Krishna et al., "Test Vector Encoding Using Partial LFSR Reseeding," ITC Int'l Test Conference, Paper 31.3, 2001 IEEE, pp. 885-893.*

Wohl et al. "X-Tolerant Compression and Application of Scan—ATPG Patterns in a BIST Architecture" IEEE ITC International Test Conference 2003, pp. 727-736.

Sitchinava et al. "Changing the Scan Enable During Shift" Proceedings of the 22nd IEEE VLSI Test Symposium 2004, consisting of 6 pages.

Mitra et al. "X-Compact: An Efficient Response Compaction Technique", IEEE Transactions on Computer-Aided Design of Integrated Circuits and Systems, vol. 23, No. 3, Mar. 2004, pp. 421-432.

Hakmi et al. "Implementing a Scheme for External Deterministic Self-Test" VLSI Test Symposium, 2005, Proceedings 23rd IEEE, May 1-5, 2005, pp. 101-106.

Reddy et al. "A Data Compression Technique for Built-In Self-Test" IEEE Transactions on Computers, vol. 37, No. 9, Sep. 1988, pp. 1151-1156.

Mitra et al. "X-Compact An Efficient Response Compaction Technique for Test Cost Reduction", ITC International Test Conference, 2002, pp. 311-320.

Chickermane et al. "Channel Masking Synthesis for Efficient On-Chip Test Compression" IEEE ITC International Test Conference 2004, pp. 452-461.

Wohl et al. "Analysis and Design of Optimal Combinational Compactors" Proceedings of the 21st IEEE VLSI Test Symposium, 2003, consisting of 6 pages.

Patel et al. "Application of Saluja-Karpovsky Compactors to Test Responses with Many Unknowns", Proceedings of the 21st IEEE VLSI Test Symposium 2003, consisting of 6 pgs.

Rajski et al. "Convolutional Compaction of Test Responses" IEEE ITC International Test Conference, 2003, pp. 745-754.

Rajski et al. "Synthesis of X-Tolerant Convolutional Compactors" Proceedings of the 23rd IEEE VLSI Test Symposium, 2005, consisting of 6 pages.

Saluja et al. "Testing Computer Hardware Through Data Compression in Space and Time" IEEE International Test Conference 1983, pp. 83-88.

David "Testing by Feedback Shift Register" IEEE Transactions on Computers, vol. C-29, No. 7, Jul. 1980, pp. 668-673.

Keller-Cadence Design Systems "An Overview of On-Chip Compression Architectures" EDN (Electronics, Design, Strategy, News) Sep. 1, 2006, pp. 61-68.

Smith, "Easily Decodable Efficient Self-Orthogonal Block Codes" IEEE , Electronic Letters Mar. 31, 1977, vol. 13 No. 7, pp. 173-174.

Cheng et al. "Compactor Independent Direct Diagnosis" Proceedings of the 13th Asian Test Symposium (ATS 2004), 6 pages.

Rajski et al. "Modular Compactor of Test Responses" Proceedings of the 24th IEEE VLSI Test Symposium (VTS 2006), 10 pages.

Wohl et al. "Fully X-Tolerant Combinational Scan Compression" International Test Conference IEEE 2007, pp. 1-10.

Gizdarski "Constructing Augmented Multimode Compactors" In: 26th IEEE VLSI Test Symposium, Apr. 2008, pp. 29-34.

PCT/US2009/055541—International Search Report and Written Opinion dated Apr. 1, 2010, 7 pages.

Rajski et al., "X-Tolerant Compactor With On-Chip Registration and Sig Nature-Based Diagnosis," IEEE Design & Test of Computers, Sep.-Oct. 2007, vol. 24, Issue 5, pp. 476-485.

(56) References Cited

OTHER PUBLICATIONS

Wohl et al., "Scalable Selector Architecture for X-Tolerant Deterministic BIST", DAC, Jun. 7-11, 2004, San Diego CA., pp. 934-939.
Han et al. "Response Compaction for Test Time and Test Pins Reduction Based on Advanced Convolutional Codes" Proceedings of the 19th IEEE International Symposium on Defect and Fault Tolerance in VLSI Systems 2004, 8 pages.
Touba "Survey of Test Vector Compression Techniques", 2006, IEEE Design & Test of Computers, vol. 23, No. 4, pp. 294-303.
Rajski et al., "Embedded Deterministic Test," IEEE Transactions on Computer-Aided Design of Integrated Circuits and Systems, vol. 23, No. 5, May 2004, pp. 776-792.
Lee et al., "Viterbi-Based Efficient Test Data Compression" IEEE Transactions on Computer-Aided Design of Integrated Circuits and Systems, vol. 31, No. 4, Apr. 2012, pp. 610-619.
Samaranayake et al., "A Reconfigurable Shared Scan-In Architecture" Proceedings of the 21st IEEE VLSI Test Symposium, 2003, consisting of 6 pages.
U.S. Appl. No. 14/044,561—Office Action dated Oct. 11, 2016, 50 pages.
Krishna et al., "Adjustable Width Linear Combinational Scan Vector Decompression", Nov. 11-13, 2003, ICCAD 03, 2003ACM, pp. 863-866.
Balakrishnan et al., "Reconfigurable Linear Decompressors Using Symbolic Gaussian Elimination", (DATE'05), Proceedings of the Design, Automation and Test in Europe Conference and Exhibition, 6 pages.
Kapur et al., "DFTMAXTm Compression Backgrounder", Fall, 2009, Technical Backgrounder, Synopsys, 5 pages.
U.S. Appl. No. 14/044,561—Response to Office Action dated Oct. 11, 2016 filed Apr. 11, 2017, 18 pages.
U.S. Appl. No. 14/044,561—Final Office Action dated Jul. 13, 2017, 30 pages.
U.S. Appl. No. 14/044,561—Response to Final Office Action dated Jul. 13, 2017 filed Dec. 28, 2017, 14 pages.
U.S. Appl. No. 14/044,561—Office Acton dated Mar. 26, 2018, 12 pages.
U.S. Appl. No. 14/044,561—Office Action dated Nov. 28, 2018, 7 pages.
U.S. Appl. No. 14/044,561—Response to Office Acton dated Mar. 26, 2018 filed Jun. 18, 2018, 18 pages.
U.S. Appl. No. 14/044,561—Response to Office Action dated Nov. 28, 2018 filed Jan. 4, 2019, 12 pages.

* cited by examiner (0,0,0) (1,1,1) (2,2,2) (0,1,0) ← 1402

| | | | $c_1=0$ |
|---|---|---|---|
| | | $c_2=0$ | | $c_3=1$ |
| $c_0=1$ | | $c_4=0$ | |

$c_0 = v_0 \oplus v_3 \oplus v_6 \oplus v_9$
$c_1 = v_1 \oplus v_3 \oplus v_6 \oplus v_9$
$c_2 = v_1 \oplus v_5 \oplus v_6 \oplus v_{10}$
$c_3 = v_1 \oplus v_3 \oplus v_8 \oplus v_{11}$
$c_4 = v_2 \oplus v_4 \oplus v_7 \oplus v_9$

| $v_0$ | $v_1$ | $v_2$ | $v_3$ | $v_4$ | $v_5$ | $v_6$ | $v_7$ | $v_8$ | $v_9$ | $v_{10}$ | $v_{11}$ | | |
|---|---|---|---|---|---|---|---|---|---|---|---|---|---|
| 1 | 0 | 0 | 1 | 0 | 0 | 1 | 0 | 0 | 1 | 0 | 0 | | $c_0$ |
| 0 | 1 | 0 | 1 | 0 | 0 | 1 | 0 | 0 | 1 | 0 | 0 | | $c_1$ |
| 0 | 1 | 0 | 0 | 0 | 1 | 1 | 0 | 0 | 0 | 1 | 0 | = | $c_2$ |
| 0 | 1 | 0 | 1 | 0 | 0 | 0 | 0 | 1 | 0 | 0 | 1 | | $c_3$ |
| 0 | 0 | 1 | 0 | 1 | 0 | 0 | 1 | 0 | 1 | 0 | 0 | | $c_4$ |

FIG. 15

$$\begin{vmatrix} v_0 & v_1 & v_2 & v_3 & v_4 & v_5 \\ 1 & 0 & 0 & 1 & 0 & 0 \\ 0 & 1 & 0 & 1 & 0 & 0 \\ 0 & 1 & 0 & 0 & 0 & 1 \\ 0 & 1 & 0 & 1 & 0 & 0 \\ 0 & 0 & 1 & 0 & 1 & 0 \end{vmatrix} = \begin{vmatrix} c_0 \\ c_1 \\ c_2 \\ c_3 \\ c_4 \end{vmatrix}$$
1602

$$\begin{vmatrix} v_6 & v_7 & v_8 & v_9 & v_{10} & v_{11} \\ 1 & 0 & 0 & 1 & 0 & 0 \\ 0 & 0 & 1 & 0 & 0 & 1 \end{vmatrix} = \begin{vmatrix} c_1 \oplus v_1 \oplus v_3 \\ c_3 \oplus v_1 \oplus v_3 \end{vmatrix}$$
1604

Table 1: Design characteristics

| Core | #Scan cells | #Faults | Scan pats. | #static var. | #dyn. var. | ADC(15,5,15) | | | |
|---|---|---|---|---|---|---|---|---|---|
| | | | | | | Encoding efficiency | TATR | pats | Δ test coverage, % |
| 1 | 2 | 3 | 4 | 5 | 6 | 7 | 8 | 9 | 10 |
| D1 | 114971 | 5.4M | 4277 | 40 | 290 | 0.78 | 162.64 | 9162 | -0.010 |
| D2 | 116495 | 6.1M | 5256 | 45 | 435 | 0.72 | 144.25 | 8843 | -0.010 |
| D3 | 120561 | 2.6M | 2336 | 33 | 87 | 0.91 | 609.91 | 3848 | -0.002 |
| D4 | 134813 | 5.6M | 2745 | 39 | 261 | 0.79 | 150.23 | 8211 | -0.007 |
| D5 | 232453 | 12.4M | 3888 | 46 | 464 | 0.71 | 198.09 | 8946 | -0.010 |
| D6 | 235134 | 4.5M | 13811 | 49 | 551 | 0.69 | 322.05 | 16806 | -0.010 |
| D7 | 261033 | 10.2M | 915 | 66 | 1044 | 0.59 | 43.14 | 4988 | -0.005 |
| D8 | 261263 | 6.1M | 1524 | 67 | 1073 | 0.58 | 114.7 | 3045 | -0.006 |
| D9 | 459884 | 21.6M | 4288 | 40 | 290 | 0.78 | 196.53 | 30406 | 0.002 |
| D10 | 480913 | 30.0M | 14782 | 40 | 290 | 0.76 | 1137.44 | 18939 | 0.064 |
| Ave. | 241752 | 10.5 | 5382.2 | 46.5 | 478.5 | 0.73 | 307.90 | 11319 | 0.001 |

FIG. 18

Table 2: Impact of compression ratio

| Comp ratio | #variables Static/dynamic | Encoding efficiency | Test Application Time Reduction (TATR) | | | | Δ test coverage, % | | | |
|---|---|---|---|---|---|---|---|---|---|---|
| | | | Dynamic Enc. | Static encoding | | | Dynamic Enc. | Static encoding | | |
| | | | | EC1 | EC10 | EC100 | | EC1 | EC10 | EC100 |
| 1× | 46.5/478.5 | 0.73 | 307.9 | 229.8 | 258.7 | 265.4 | 0.001 | -0.008 | -0.002 | -0.003 |
| 2× | 64.0/986.0 | 0.68 | 211.29 | 180.6 | 190.4 | 195.6 | 0.014 | 0.007 | 0.006 | 0.004 |
| 3× | 81.5/1493.5 | 0.64 | 160.42 | 148.5 | 151.3 | 152.8 | 0.014 | 0.005 | 0.007 | 0.005 |
| 4× | 99.0/2001.0 | 0.62 | 127.18 | 121.1 | 122.3 | 123.5 | 0.009 | 0.001 | 0.003 | 0.002 |

FIG. 19

POWER-AWARE DYNAMIC ENCODING

DESCRIPTION OF RELATED ART

Electronic design automation (EDA) is applied in the semiconductor industry for virtually all design projects. After an idea for the product is developed, EDA tools are used to define a specific implementation including lithographic masks for production of the finished chips, in a process referred to as tape-out. The lithographic masks are then used with fabrication equipment to manufacture integrated circuit wafers. Testing and diagnosis are required steps to determine defective dies and defect localization. Next, physical failure analysis is performed to identify root causes for systematic defects which are used for correction of masks, and design and fabrication process improvements in order to increase yield. Finally, the wafers are diced, packaged and assembled to provide integrated circuit chips for distribution.

An exemplary procedure for using EDA tools begins with a design specification of a product to be implemented using the integrated circuit. Next, logic design tools are applied to create a high level description based on description languages such as Verilog or VHDL, and functional verification tools are applied in an iterative process to assure that the high-level description accomplishes the design specification. Next, synthesis and design-for-test tools are used to translate the high-level description to a netlist, optimize the netlist for target technology, and insert test logic that permits testing of the finished chips.

A typical design flow might next include a design planning stage, in which an overall floor plan for the chip is constructed and analyzed to ensure that timing parameters for the netlist can be achieved at a high level. Next, the netlist may be rigorously checked for compliance with timing constraints and with the functional definitions defined at a high level using VHDL or Verilog. After an iterative process to settle on a netlist and map the netlist to a cell library for the final design, a physical implementation tool is used for placement and routing. A tool performing placement positions circuit elements on the layout, and a tool performing routing defines interconnects for the circuit elements.

The components defined after placement and routing are usually then analyzed at the transistor level using an extraction tool, and verified to ensure that the circuit function is achieved and timing constraints are met. The placement and routing process can be revisited as needed in an iterative fashion. Next, the design is subjected to physical verification procedures, such as design rule checking (DRC), layout rule checking (LRC) and layout versus schematic (LVS) checking, that analyze manufacturability, electrical performance, lithographic parameters, and circuit correctness.

After closure on an acceptable design by iteration through design and verify procedures, like those described above, the resulting design can be subjected to resolution enhancement techniques that provide geometric manipulations of the layout to improve manufacturability. Finally, the mask data is prepared and taped out for use in producing finished products.

This design process with EDA tools includes circuitry that allows the finished product to be tested. Efficient testing of integrated circuits often uses structured design for testability (DFT) techniques. In particular, these techniques are based on the general concepts of making all or some memory elements like flip-flops and latches in the circuit under test (CUT) directly controllable and observable. The most-often used DFT methodology is based on scan chains. This approach assumes that during testing all (or almost all) memory elements are included in shift registers called scan chains. As a result, the designed logic circuit has two (or more) modes of operation, including at least a functional mode and a test mode. In the functional mode, the memory elements perform their regular functions. In the test mode, the memory elements become scan cells that are connected to form one or more scan chains. These scan chains are used to scan-in test stimuli into a CUT and scan-out test responses. Applying a test pattern consists of performing scan-in of (or loading) a test stimulus, applying one or more capture clocks, and then performing scan-out of (unloading) the captured test response. The test responses are then compared to fault-free test responses to determine whether the CUT works properly.

The DFT methodology has been widely used in order to simplify testing and diagnosis. From the point of view of automatic test pattern generation (ATPG), a CUT can be treated as a combinational or partially combinational circuit. Today, ATPG software tools are able to generate a set of test patterns based on different fault models including stuck-at, transition, path delay, bridging and cell-internal faults. When a particular fault in a CUT is targeted by an ATPG tool, only a small number of scan cells (typically less than 1 percent) is set in particular values (called hereafter care bits) and one scan cell (an observable point) is observed in order to detect this fault wherein the specified care bits are required to sensitize this fault and propagate the fault effect to the selected observable point, with the remaining scan cells being don't care bits. A common approach for test application time reduction (TATR) is to use compressed test data rather than storing the entire test stimulus and the entire test response in the tester. A block diagram of an integrated circuit having an on-chip test data compression capability is shown in FIG. 1. Accordingly, a tester 101 is coupled to an integrated circuit 102 comprising a CUT 103, a decompressor 104 and a compressor 105. In addition, the CUT may have one or more cores such that each core has an individual decompressor and compressor. Characteristics of decompressor and compressor schemes as well as the routing of compressed test data from and to the tester have a major impact on the level of test data compression.

SUMMARY

Prospective decompressor schemes are summarized in FIG. 2. Accordingly, decompression schemes are classified as combinational FIG. 2(a), sequential with limited sequential depth FIG. 2(b) and sequential FIG. 2(c). The combinational decompressor in FIG. 2(a) includes a combinational block 202 (an expander or phase shifter) typically comprising XOR and NXOR gates (for linear decompressors) and MUX gates (for non-linear decompressors) such that decompressed test stimuli loaded into scan chains are calculated as a logic function of one or more streaming tester channels. The combinational decompressors have simple hardware that often supports a dynamic encoding wherein the encoding process is incorporated into the ATPG implication process. A challenge for the combinational decompressors is that they encode all specified care bits in one shift cycle using only variables from the tester which are dedicated for this shift cycle. The worst-case, most highly specified shift cycles tend to limit the level of test data compression because when the number of scan chains increases then the number of variables per shift cycle is sufficiently large to encode the most highly specified shift cycles.

Sequential decompressors are usually a linear finite-state machine including one or more shift registers, linear feedback shift registers (LFSRs), cellular automata and ring generators. Sequential decompressors allow variables from current and earlier shift cycles to be used for encoding care bits in the current shift cycle. As a result, the sequential decompressors provide more diverse of an output space with less decompressor-imposed constraints than the combinational decompressors. A decompressed test stimulus generated by linear decompressors comprises a test cube $C=\{c_0, c_1, \ldots, c_{m-1}\}$ including m care bits if and only if a system of linear equations $AV=C$ has a solution where A is a n×m characteristic matrix of the linear decompressor and $V=\{v_0, v_1, \ldots, v_{n-1}\}$ is a set of variables from the tester. The conventional encoding process for sequential decompressors requires solving a system of linear equations (SLEs) including one equation per care bit. More formally, the characteristic matrix is a binary matrix (comprising only 1s and 0s) such that each row corresponds to a care bit and each column corresponds to a variable from the tester. The entry in row i and column j in the characteristic matrix has the value 1 if and only if the i-th care bit depends on the j-th variable. After Gauss-Jordan elimination, all linearly independent rows are found. A solution exists if a superposition of sets of linearly dependent rows is equal to 0. If a solution does not exist then the test cube is unencodable. Clearly, it is unlikely to encode test cubes having more specified care bits than the number of available variables from the tester. However, if the number of variables is sufficiently larger than the number of specified care bits then the probability of not finding a solution (or having an encoding conflict) is negligible. The computational complexity of the conventional encoding process is $O(nm^2)$. As a result, the sequential linear decompressor schemes use a static encoding wherein test cubes are first generated, then checked for compatibility and finally encoded. In contrast, the simple decompressor schemes use a dynamic encoding wherein each specified care bit is immediately encoded during branch-and-bound search so that all encoding conflicts are identified and resolved during ATPG. In addition, the simple decompressor schemes allow extracting most of all necessary scan cell assignments or implications for a particular test cube (set of care bits) based on the decompressor-imposed constraints that allow an efficient pruning of the branch-and-bound search space.

Routing test data between the tester and a sequential decompressor scheme is based on static or dynamic reseeding. Decompressors based on dynamic reseeding typically receive one seed (or set of static variables having the same scope) per test pattern plus one or more dynamic variables per shift cycle via streaming tester channels wherein both static and dynamic variables are mixed together in the decompressor scheme in order to maximize the encoding flexibility. From a tester standpoint, the dynamic reseeding provides an elegant solution and avoids the need for any special scheduling and synchronization. Decompressor schemes based on dynamic reseeding typically receive a fixed number of test data bits per test pattern which is determined such that both test coverage loss and test pattern inflation are minimized with respect to the conventional scan mode. A challenge for the decompressor schemes using the dynamic reseeding is to minimize test data volume since fewer care bits are required at the end of the test pattern set. In contrast, decompressor schemes based on static reseeding typically use multiple seeds per test pattern and seed overlapping. They can selectively encode as many care bits as needed while maintaining a high encoding efficiency (i.e. a ratio of successfully encoded care bits to the deployed bits from the tester). A challenge for the decompressor schemes using the static reseeding is to minimize time overhead because reseeding may delay shift operations.

Last but not least, the decompressor schemes need to minimize the scan-in switching rate during a shift operation in order to reduce power dissipation in the test mode. High power dissipation during test may result in either overheating or supply voltage noise—either of which can cause a device malfunction leading to loss of yield, reliability degradation, or even permanent damage of the CUT. A peak in scan-in switching is estimated based on a toggling rate in the decompressed test stimuli during the last shift cycle. Typically, the toggling rate in the decompressed test stimuli 302 is reduced by adding a control block 304 and either one or more shadow registers 306 before a phase shifter/expander network 308 in FIG. 3(a) or one or more selectors 330 after the phase shifter/expander network 308 in FIG. 3(b). Particularly, the control block includes one or more selectors and a programmable controller. The control block selectively modifies original test stimuli by loading the same values or a fixed value of 0 or 1 in two or more consecutive shift cycles. Various examples for the selector are shown in FIG. 4(a), 4(b), 4(c) and the shadow register is shown in FIG. 4(d). Note that an efficient implementation of the selector circuitry shown in FIG. 4(c) may include the first scan cell in the corresponding scan chain.

One aspect of the technology is an apparatus comprising an EDA tool. The EDA tool is adapted to transform a circuit design to include design-for-test circuitry. The design-for-test circuitry includes selection circuitry selectively coupling a plurality of test stimulus sources to a decompressor circuit for generation of a decompressed test stimulus for detecting fault in a circuit under test in the circuit design. The plurality of test stimulus sources include a static test stimulus source and a dynamic test stimulus source. The selection circuitry selectively enables the dynamic test stimulus source.

In one embodiment of the technology the dynamic test stimulus source is selectively enabled for a subset of care bits based on a grouping mechanism.

In one embodiment of the technology the dynamic test stimulus source includes a circular register such that at least one bit of said circular register is coupled to each scan chain in the circuit under test.

In one embodiment of the technology the dynamic test stimulus source includes two circular registers such that each scan chain in the CUT is coupled to each of said two circular registers.

In one embodiment of the technology the decompressed test stimulus is generated based on a superposition of the static test stimulus source and the dynamic test stimulus source.

In one embodiment of the technology the design-for-test circuitry further comprises a programmable controller generating control signals to control the selection circuitry.

Another aspect of the technology is an apparatus comprising an EDA tool. The EDA tool controls automatic test pattern generation with design-for-test circuitry of a circuit design. The design-for-test circuitry includes selection circuitry. The selection circuitry selectively couples a plurality of test stimulus sources to the decompressor circuitry for generation of a decompressed test stimulus for detecting fault in a circuit under test in the circuit design. The plurality of test stimulus sources include a static test stimulus source and a dynamic test stimulus source. The selection circuitry selectively enables the dynamic test stimulus source.

In one embodiment of the technology the dynamic test stimulus source is selectively enabled for a subset of care bits based on a grouping mechanism.

In one embodiment of the technology the dynamic test stimulus source includes a circular register such that at least one bit of said circular register is coupled to each scan chain in the circuit under test.

In one embodiment of the technology the dynamic test stimulus source includes two circular registers such that each scan chain in the CUT is coupled to each of said two circular registers.

In one embodiment of the technology the decompressed test stimulus is generated based on a superposition of the static test stimulus source and the dynamic test stimulus source.

In one embodiment of the technology the static test stimulus source generates same test data bits for two or more consecutive shift cycles.

In one embodiment of the technology the design-for-test circuitry further comprises a programmable controller generating control signals to control the selection circuitry.

In one embodiment of the technology the automatic test pattern generation further generates the control variables for the programmable controller.

A further aspect of the technology is an apparatus comprising an EDA tool.

The EDA tool is adapted to transform a circuit design to include design-for-test circuitry. The design-for-test circuitry includes decompressor circuitry for generation of a decompressed test stimulus for detecting faults in a circuit under test in the circuit design. The decompressor circuitry generates care bits based on a system of linear equations such that the system of linear equations includes a first disjoint set of static variables and a second disjoint set of dynamic variables. Equations of the system of linear equations include at least one variable from the second disjoint set of dynamic variables and the variables of said second disjoint set of dynamic variables are selectively enabled for a subset of the care bits.

In one embodiment of the technology the variables of said second disjoint set of dynamic variables are selectively enabled for the subset of care bits based on a grouping mechanism.

In one embodiment of the technology the variables of said second disjoint set of dynamic variables are loaded into a dynamic test stimulus source.

In one embodiment of the technology the dynamic test stimulus source includes a circular register such that at least one bit of said circular register is coupled to each scan chain in the circuit under test.

In one embodiment of the technology the dynamic test stimulus source includes two circular registers such that each scan chain in the CUT is coupled to each of said two circular registers.

Yet another aspect of the technology is an apparatus, comprising an EDA tool. The EDA tool controls automatic test pattern generation with design-for-test circuitry of a circuit design. The design-for-test circuitry includes decompressor circuitry for generation of a decompressed test stimulus for detecting faults in a circuit under test in the circuit design. The decompressor circuitry generates care bits based on characteristic equations such that the characteristic equations include at least one variable of a first disjoint set of static variables, and at least one variable of a second disjoint set of dynamic variables. Said at least one variables of said second disjoint set of dynamic variables are selectively enabled for a subset of the care bits.

In one embodiment of the technology the variables of said second disjoint set of dynamic variables are selectively enabled for the subset of care bits based on a grouping mechanism.

In one embodiment of the technology the variables of said second disjoint set of dynamic variables are loaded into a dynamic test stimulus source.

In one embodiment of the technology the dynamic test stimulus source includes a circular register such that at least one bit of said circular register is coupled to each scan chain in the circuit under test.

In one embodiment of the technology the dynamic test stimulus source includes two circular registers such that each scan chain in the CUT is coupled to each of said two circular registers.

Yet a further aspect of the technology is an apparatus comprising an EDA tool for processing data based on design-for-test circuitry of a circuit design. The design-for-test circuitry includes decompressor circuitry for generation of a decompressed test stimulus based on characteristic equations such that the characteristic equations include at least one variable of a first disjoint set of static variables, and at least one variable of a second disjoint set of dynamic variables. Said at least one variable of the second disjoint set of dynamic variables of the characteristic equations is selectively enabled.

In one embodiment of the technology the decompressed test stimulus includes care bits for detecting faults in a circuit under test in the circuit design. The at least one variable of said second disjoint set of dynamic variables, is selectively enabled for a subset of the care bits based on a grouping mechanism.

In one embodiment of the technology the at least one variable of said second disjoint set of dynamic variables is loaded into a dynamic test stimulus source.

In one embodiment of the technology the dynamic test stimulus source includes a circular register such that at least one bit of said circular register is coupled to each scan chain in the circuit under test.

In one embodiment of the technology the dynamic test stimulus source includes two circular registers such that each scan chain in the circuit under test is coupled to each of said two circular registers.

In one embodiment of the technology processing data includes at least one of the following: reading a specification of the design-for-test circuitry, identification of the design-for-test circuitry, performing a design rule check, performing ATPG, performing simulation, performing fault simulation, and performing fault diagnosis.

BRIEF DESCRIPTION OF THE DRAWINGS

FIG. 14 shows 4 scan chains with triplets and scan chains generated during ATPG.

FIG. 15 shows the system of the linear equations with a row for each care bit and a column for each variable.

FIG. 16 shows a system of linear equations for calculating a statics seed and another system of linear equations for calculating a dynamic seed.

FIG. 17 shows a resulting static stimulus and a resulting dynamic stimulus and a generated decompressed test stimulus.

FIG. 18 is a table of experimental results for static and dynamic encoding.

FIG. 19 is another table of compression results for static versus dynamic encoding.

DETAILED DESCRIPTION

The following examples are specific non-limiting examples illustrating various advantageous features of the presented technology. Only a subset of features demonstrated in a single example may be in an embodiment of the presented technology. An embodiment of the presented technology may include features from multiple examples. The number and length of scan chains, the number and length of segments, number and type of seeds and variables, existence of toggling, toggling rate, and configurations are changeable with different embodiments.

Figure 1:
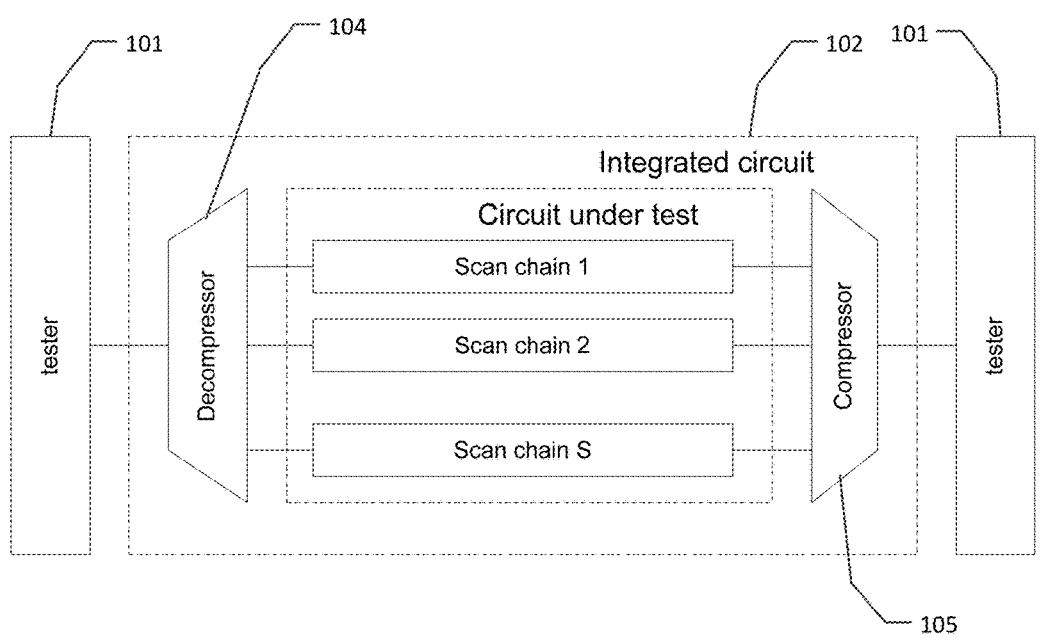
FIG. 1 is a block diagram of an IC with on-chip data compression capability.
Figure 2A:
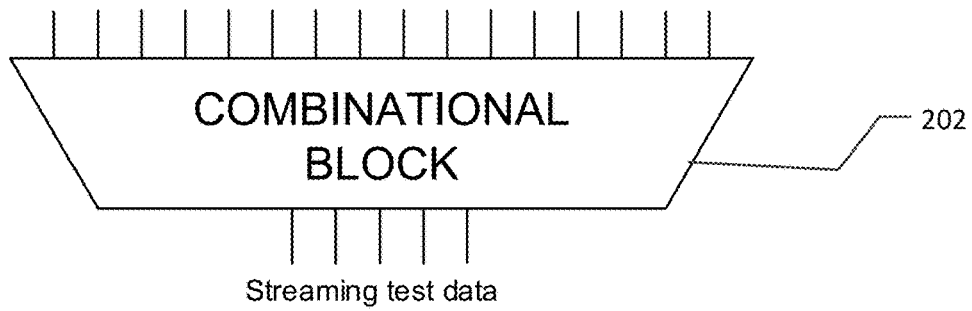
FIGS. 2(a)-2(c) show decompressor schemes.
Figure 2B:
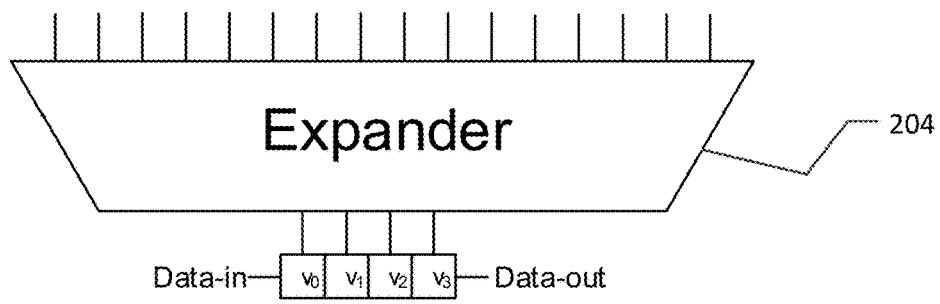
Figure 2C:
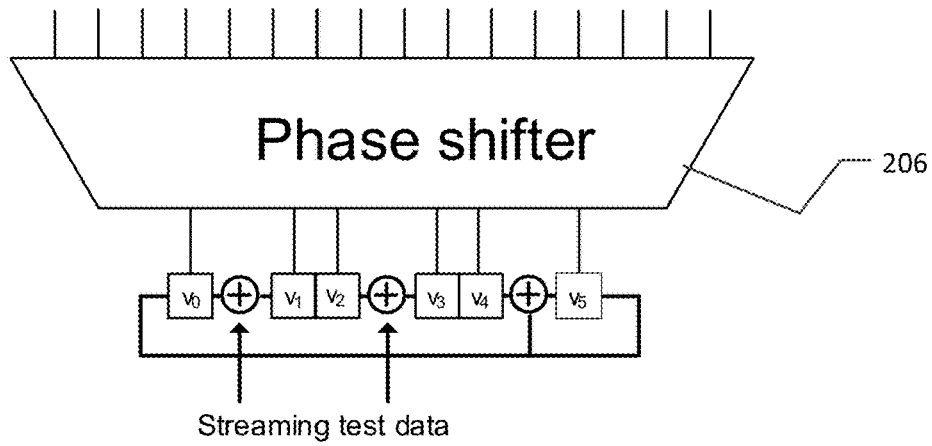
Figure 3A:
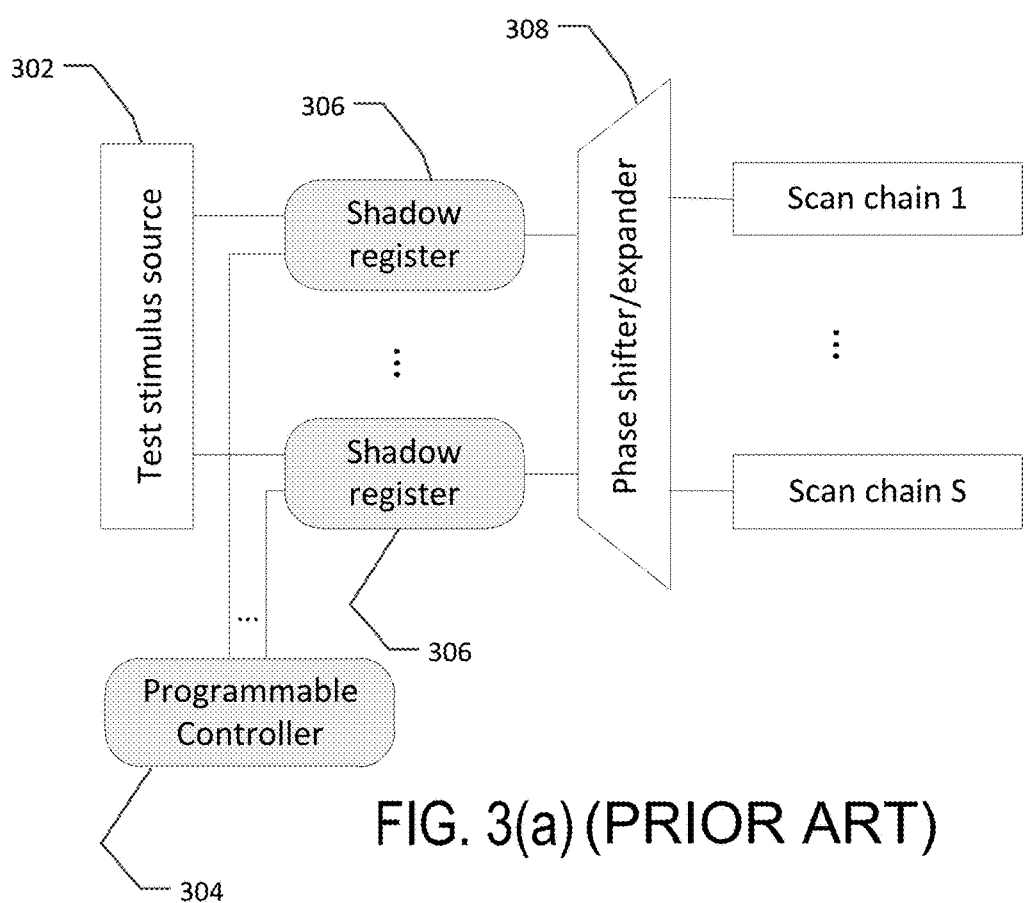
FIGS. 3(a)-3(b) show decompressor schemes with a reduced toggling rate.
Figure 3B:
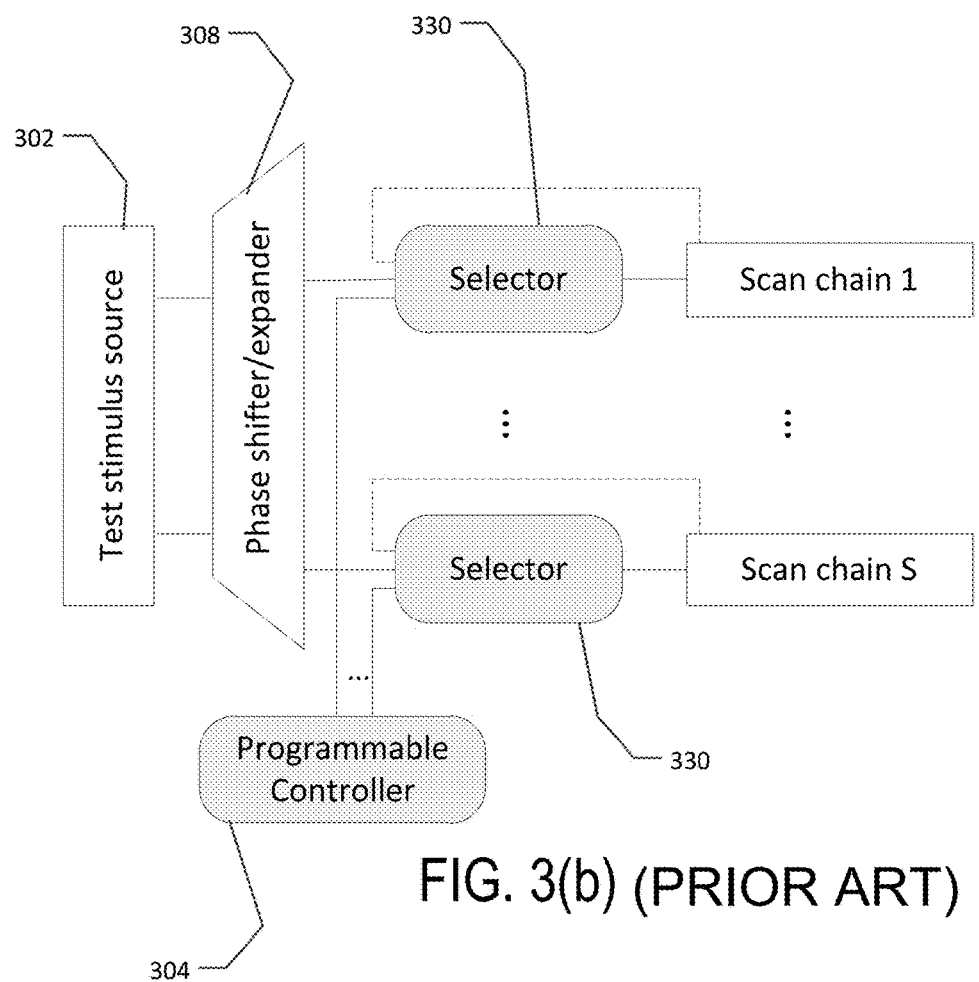
Figure 4A:
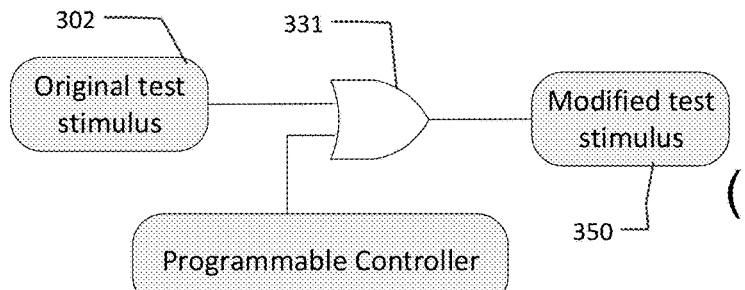
FIGS. 4(a)-4(c) show selector circuitry to selectively modify the original test stimulus.
Figure 4B:
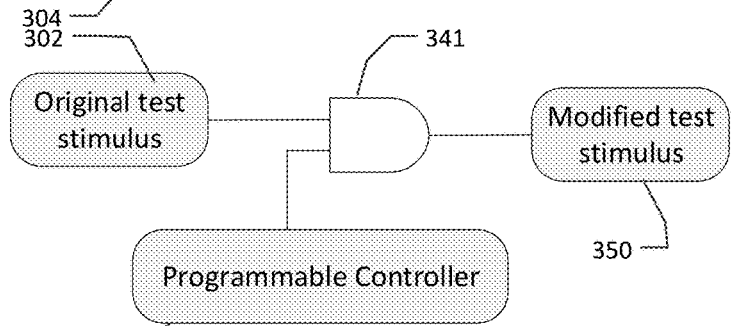
Figure 4C:
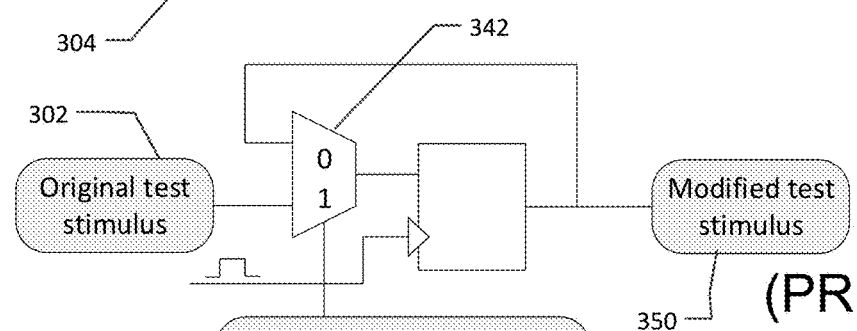
Figure 4D:
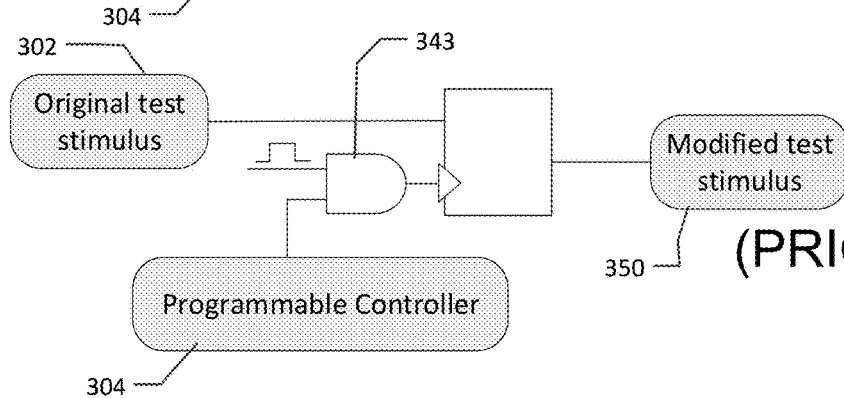
FIG. 4(d) shows a shadow register to selectively modify original test stimulus.
Figure 5:
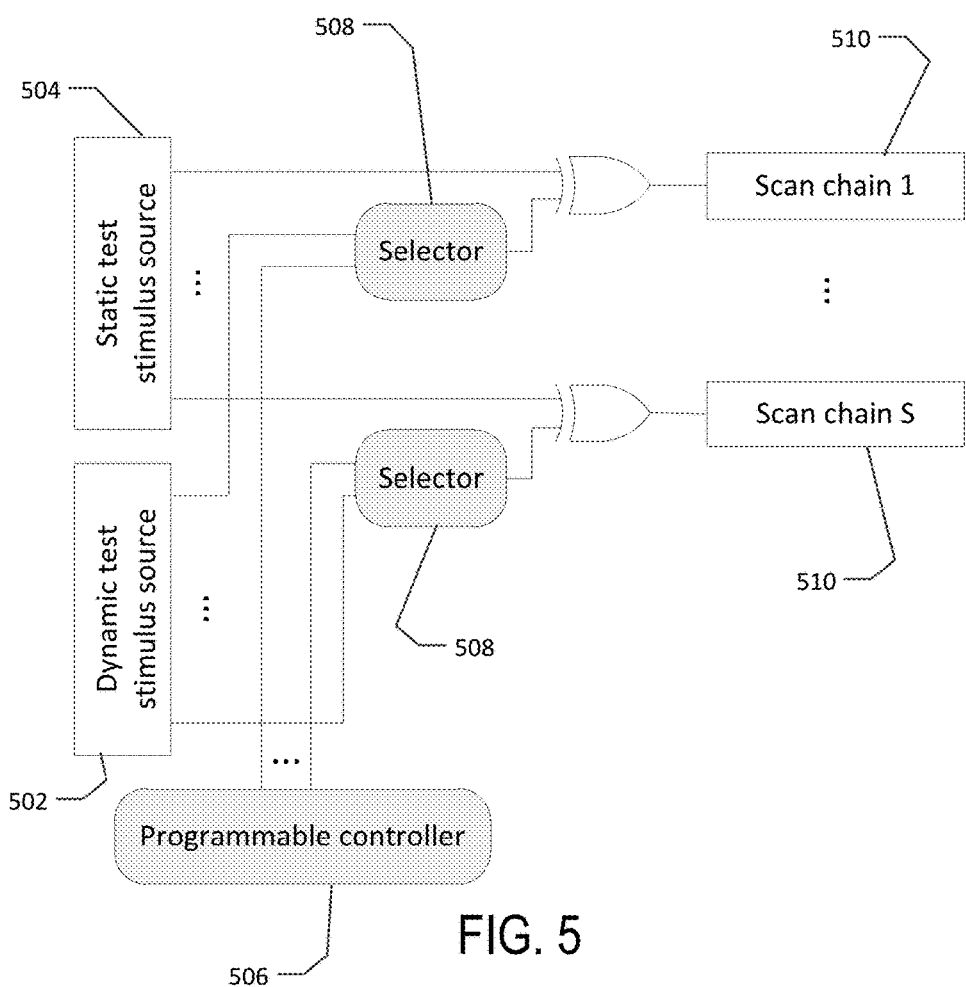
FIG. 5 shows a block diagram of the power-aware decompressor.

In FIG. 5, a block diagram of the proposed power-aware decompressor scheme shows the following blocks: 1) dynamic test stimulus source 502, 2) static test stimulus source 504 and 3) a programmable controller 506 including a plurality of selectors 508 such that each selector can selectively enable dynamic test stimulus for a group of scan cells 510 called hereafter "power-groups". Both test stimulus sources can be inserted in a circuit design by a DFT software tool such as Synopsys DFT Compiler. Two disjoint sets of test data called static variables and dynamic variables are stored into the static test stimulus sources 505 and dynamic test stimulus sources 502, respectively, and control variables are stored into the programmable controller 506. The content of these variables is calculated by an ATPG module such as Synopsys TetraMAX and stored into one or more test patterns based on a specific format. The control variables and the programmable controller 506 divide scan cells 510 into power-groups based on the following three criteria:
a) per shift (e.g., shift cycles are associated with rows in a 2D scan cell array); b) per scan chains (e.g., scan chains are associated with columns in a 2D scan cell array) and c) combined as an intersection of selected chains and selected consecutive shift cycles (e.g., let a set of adjacent rows in a 2D array form a group of consecutive shift cycles and a set of columns in a 2D array form a group of scan chains; then all scan cells that belong in an intersection of said group of shift cycles and said group of scan chains forms a power-aware group of scan cells). Toggling in the static test stimulus 504 is expected to be very low, which reduces power consumption and reduces temperature that would otherwise increase along with power consumption.

Typically, the static test stimulus 504 may change per pattern, two or more consecutive shift cycles, or two or more patterns. In this way, the static test stimulus source 504 generates test stimulus that stays constant for two or more consecutive shift cycles, or all shift cycles of one or more test patterns. Therefore, significant toggling in decompressed test stimulus is expected only in the selected shift cycles and the selected scan chains. In a particular case, if a power-group of scan cells is enabled then bits of the decompressed test stimulus which are loaded into the selected scan cells are calculated as a superposition of corresponding bits of the dynamic and static test stimulus while bits of the decompressed stimulus which are loaded into the remaining (non-selected) scan cells are determined by corresponding bits of the static test stimulus. In this way, the toggling rate in this non-selected scan cells will be minimized, which reduces power consumption and reduces temperature that would otherwise increase along with power consumption. More formally, different values are shifted into a scan chain in two consecutive shift cycles, resulting in switching activities at inputs of the associated combinational circuit. These switching activities produce 0 to 1 and 1 to 0 transitions that may propagate in the associated combinational circuit.

Recently, the augmented product codes have been successfully used for constructing space and time compactors as well as sequential linear decompressors, for example, in U.S. Pat. Nos. 7,949,921; 8,914,695; 9,134,378, and US patent application 20140095101, for Synopsys, all incorporated by reference herein. The following procedure describes a construction of a power-aware linear decompressor scheme.

Procedure 1:

Let $N^3$ scan chains be viewed as an N×N×N array and a unique triplet (x,y,z) be assigned to a chain in row x, column y and block z where N≥2. Augmented decompressor (ADC), ADC(N,4), consists of four registers $R_0, R_1, \ldots, R_3$ of length N and a linear expander which is constructed based on the following steps: (i) assign a unique triplet (x,y,z) to each scan chain where x,y,z∈{0, 1, 2, ..., N−1}; (ii) assign an index {0, 1, 2, ..., N−1} to flip-flops in each register; (iii) assign a unique formula {y, (x+z) mod N, x, (x+y+z) mod N} to each register $R_k$ where k=(0, 1, ..., 3); and (iv) couple each scan chain (x,y,z) to one flip-flop in each register such that the value of the corresponding formula determines the index of the flip-flop in each register; and (v) couple all flip-flops such that register $R_2$ and $R_3$ forms circular registers.

Procedure 1 guarantees that any three scan cells are linearly independent if a circular register of the ADC(N,4) receives N-bit dynamic seed per N shift cycles. In this way, the static test stimulus is generated by registers $R_0$ and $R_1$ which typically receives one static seed per pattern. The dynamic test stimulus is generated by circular registers $R_2$ and $R_3$ which typically receive one dynamic seed per T shift cycles where T≤N and parameter T is called a scope of dynamic seeds.

Figure 6:
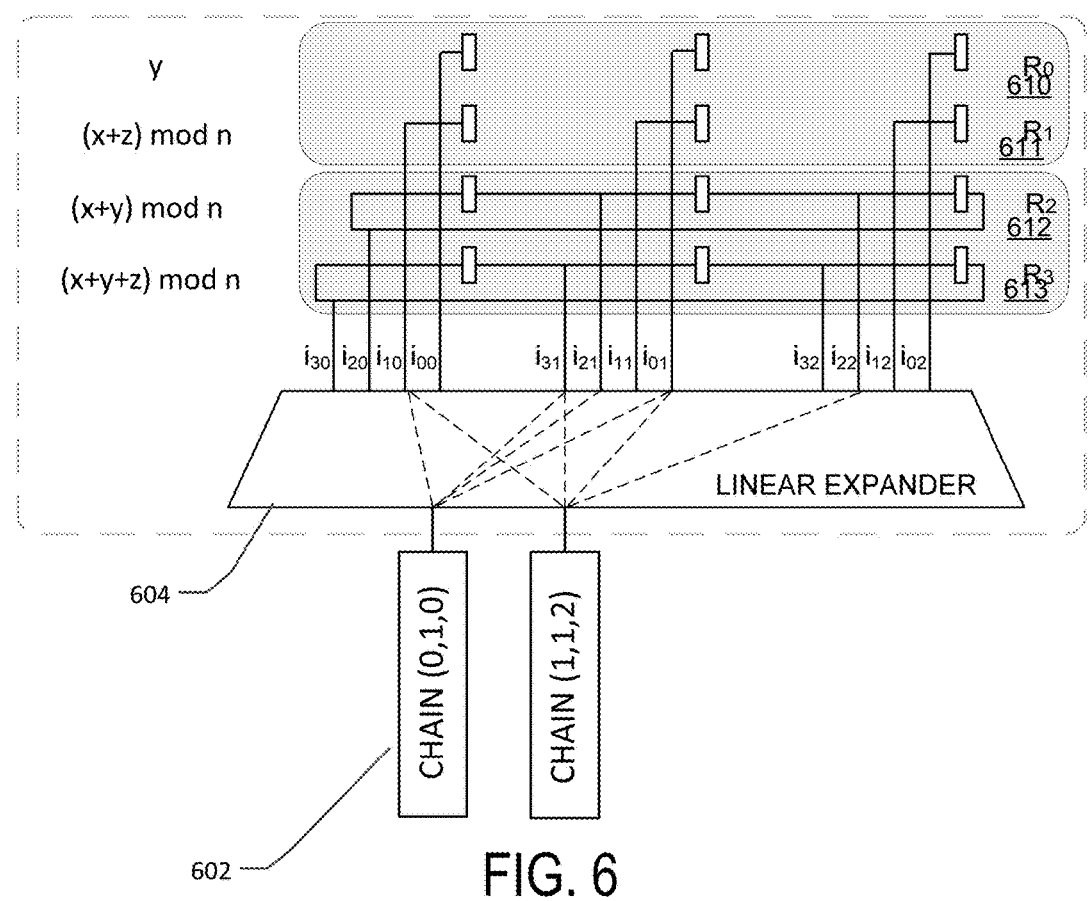
FIG. 6 illustrates the construction of a decompressor.

FIG. 6 illustrates a construction of the ADC(3,4) based on Procedure 1. First, each register $R_0$ 610, $R_1$ 611, $R_3$ 612, $R_4$ 613 is uniquely associated with a formula. Let triplets (0,1,0)

and (1,1,2) be assigned to two scan chains 602 under consideration. A linear expander 604 is constructed by coupling each scan chain to one flip-flop in each register such that the value of the corresponding formula determines the index of the flip-flop. Next step is to configure register $R_2$ 612 and $R_3$ 613 as circular registers. In this way, the static test stimulus is generated by registers $R_0$ 610 and $R_1$ 611, which receive data and periodically shift data or do not shift data in order to minimize the toggling rate in the decompressed test stimulus. The dynamic test stimulus is generated by circular registers $R_2$ 612 and $R_3$ 613, which shift data and periodically receive data.

Figure 7:
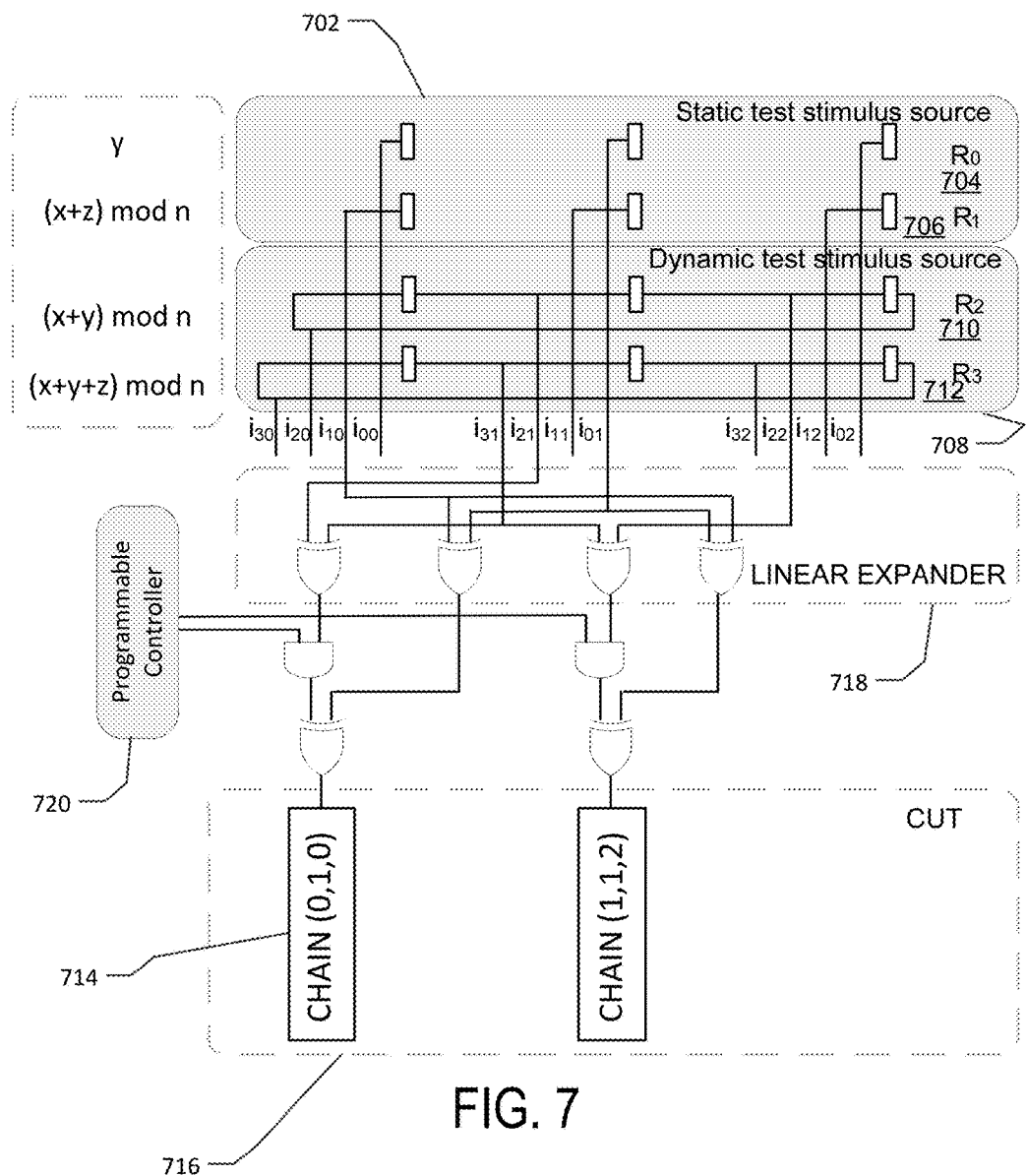
FIG. 7 illustrates the construction of a power-aware decompressor.

FIG. 7 shows a power-aware ADC(3,4) which is constructed based on Procedure 1. The static test stimulus source 702 includes registers $R_0$ 704 and $R_1$ 706 and the dynamic test stimulus source 708 includes registers $R_2$ 710 and $R_3$ 712. First, a unique triplet (x,y,z) is assigned to each scan chain 714 in the CUT 716 and a unique formula f(x,y,z) is assigned to each register. The linear expander 718 is constructed by coupling each scan chain to one flip-flop in each register such that the value of the assigned formula determines the index of the flip-flop. Next, a programmable controller 720 specified a selection mechanism based on grouping scan cells among the plurality of scan chains and consecutive shift cycles. Last, the programmable controller 720 is coupled in such a way that the dynamic test stimulus 708 is selectively enabled for one or more power-groups. As a result, each scan cell is associated with a set of variables which are loaded into registers $R_0$ 704, $R_1$ 706, $R_2$ 710 and $R_3$ 712. The said set of variables including two static variables from registers $R_0$ 704 and $R_1$ 706 and two dynamic variables from register $R_2$ 710 and $R_3$ 712 such that the dynamic variables can be selectively enabled. The toggling rate is reduced by enabling a subset of power-groups.

Dynamic Linear Encoding

Figure 8:
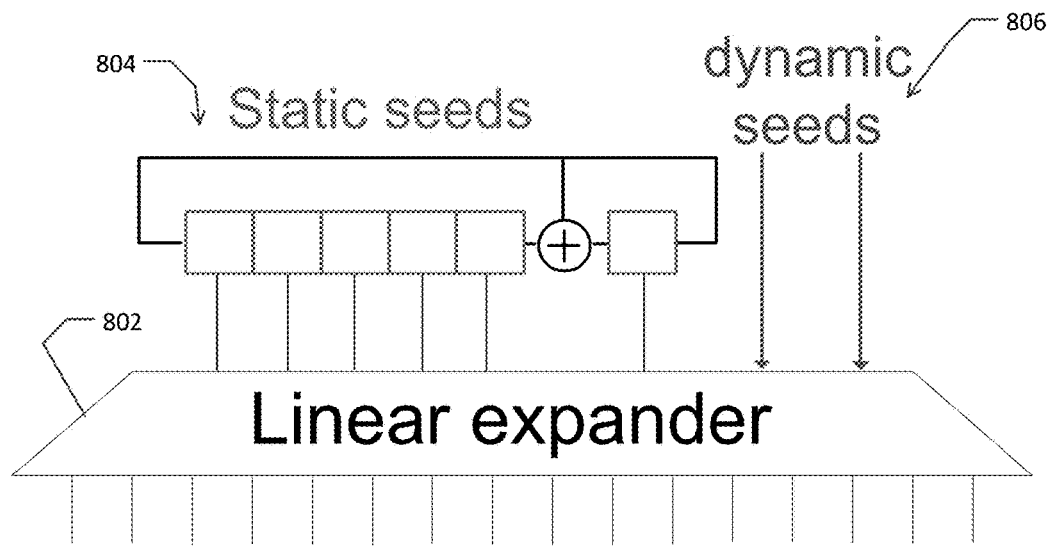
FIG. 8 shows a linear compressor with reduced time complexity for linear encoding.

The dynamic encoding cannot be directly associated with either linear or non-linear decompressors. For example, a major obstacle for incorporating the conventional linear encoding into the branch-and-bound search is its time complexity which can be further magnified by ATPG backtracking. FIG. 8 shows a linear decompressor 802 that has the potential to significantly reduce the time complexity of the linear encoding. The proposed linear decompressor 802 receives one static seed 804 per pattern and one dynamic seed 806 per shift cycle. In other words, the scope of static variables is one pattern and the scope of dynamic variables is one shift cycle. For simplicity, let the characteristic equation of each scan cell include one dynamic variable. As a result, the dynamic variables divide scan cells into groups. The linear encoding may use dynamic seeds 806 for encoding the first care bits for each group of scan cells and the static seeds 804 for encoding all remaining care bits. The potential speedup of the linear encoding will be of the order of $O(r^3)$ where r is the ratio between the number of dynamic and static variables. The drawback is that the limited scope of the dynamic variables reduces the encoding efficiency of the described decompressor. The encoding efficiency of the described compressor can be increased by increasing the scope of dynamic variables and if the characteristic equation of each scan cell includes two or more dynamic variables instead of one dynamic variable.

Encoding Procedure:

Let SLEs include two distinctive sets of variables called herein static and dynamic. A SLEs is k-partite if the dynamic variables are divided into k disjoint sets of variables such that each equation of the SLEs includes at most one dynamic variable of each disjoint set. Dynamic variables of a k-partite SLEs divide scan cells into groups such that all scan cells of a group depend on the same k dynamic variables. Let the first care bit of a linearly independent group be dynamic and all other care bits be static. The proposed encoding procedure divides a partite SLEs into a SLEs based on dynamic variables and a SLEs based on static variables such that i) for each dynamic care bit, the SLEs of the dynamic variables includes one dynamic equation and ii) for each static care bit, the SLEs of the static variables includes one augmented equation which is calculated as a superposition of characteristic equations of the static care bit and a set of relevant dynamic care bits. For independent groups, the set of relevant dynamic care bits includes the first care bit for the corresponding independent group. For a dependent group, the set of relevant dynamic care bits includes the first care bit of all independent groups which are associated with a dependent group.

Example 1

Figure 9:
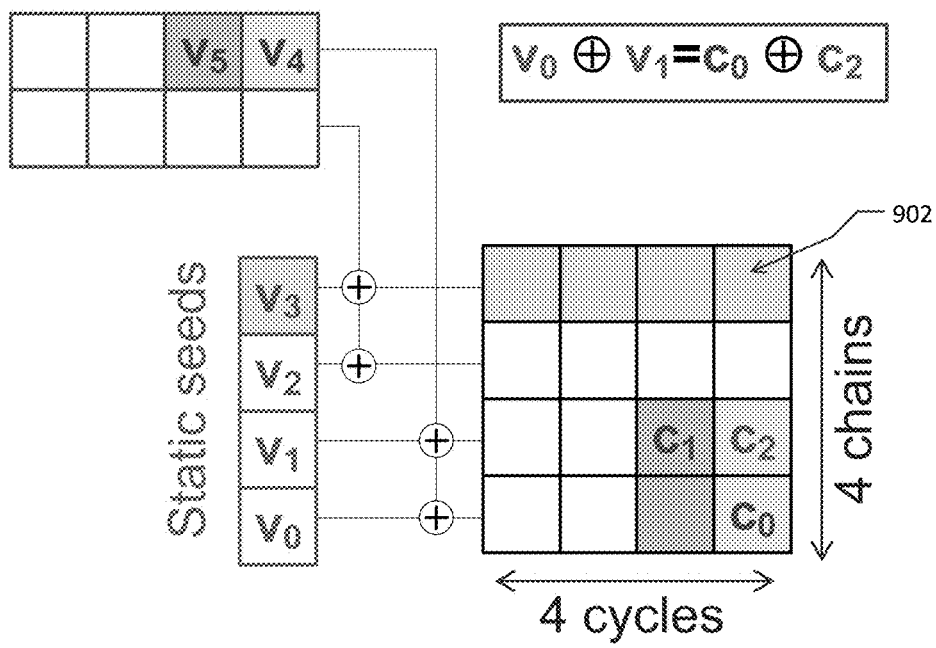
FIG. 9 shows an example encoding with scan cells that depend on one static valuable and one dynamic valuable.

FIG. 9 shows an example wherein the scan cells 902 depend on one static variable and one dynamic variable. The conventional linear encoding generates SLEs having 12 variables. The resultant SLEs is 1-partite because each characteristic equation includes one dynamic variable. As a result, each dynamic variable can be uniquely associated with a group of scan cells. Also, all groups of scan cells are linear independent because they are uniquely associated with dynamic variable. Let $c_0$, $c_1$ and $c_2$ be an ordered set of care bits which are generated during the branch-and-bound search. Care bits $c_0$ and $c_1$ are dynamic because they are the first care bit in group $v_4$ and group $v_5$, respectively. Next, $c_2$ is the second care bit of group $v_4$ therefore the SLEs must include an augmented equation for this care bit. In the particular case, a set of relevant dynamic care bits includes $c_0$, i.e., the first care bit of the corresponding group $v_4$. The characteristic equations of $c_0$ and $c_2$ are $v_0 \oplus v_4 = c_0$ and $v_1 \oplus v_4 = c_1$, respectively. Since both care bits $c_0$ and $c_2$ depend on $v_4$, the resultant augmented equation includes static variables only. In this way, the 1-partite SLEs is partitioned into SLEs based on the static variables and 1-partite SLEs based on the dynamic variables.

Example 2

Figure 10:
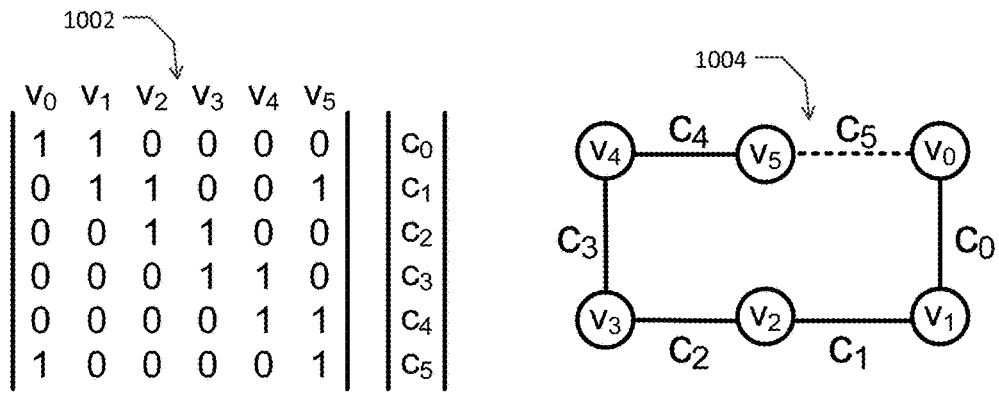
FIG. 10 shows and example of identifying encoding conflicts in a 2-partite system of linear equations.

FIG. 10 shows an example for an identification of encoding conflicts for 2-partite LSEs. Let $c_0, c_1, \ldots, c_5$ be an ordered set of care bits during ATPG. All encoding conflicts in the resultant SLEs based on the dynamic variables can be identified using a graph 1002 such that i) each node is associated with a variable and ii) each vertex is associated with an equation and is labeled with the value of this linear equation. A linear dependency exists if the corresponding graph has a loop 1004. An encoding conflict exists if the loop 1004 has an odd number of 1's. Let the SLEs based on the dynamic variables include the following dynamic equations: $v_0 \oplus v_1 = c_0$, $v_1 \oplus v_2 = c_1$, $v_2 \oplus v_3 = c_2$, $v_3 \oplus v_4 = c_3$, $v_4 \oplus v_5 = c_4$ and $v_0 \oplus v_5 = c_5$. FIG. 10 shows the SLEs and the corresponding graph 1002. The presented graph has one loop 1004 and an encoding conflict exists if $c_0 \oplus c_1 \oplus c_2 \oplus c_3 \oplus c_4 \oplus c_5 = 1$. Therefore, care bit $c_5$ is a static because it belongs to a dependent group and $c_0$, $c_1$, $c_2$, $c_3$ and $c_4$ are relevant dynamic care bits of static care bit $c_5$.

Example 3

Figure 11:
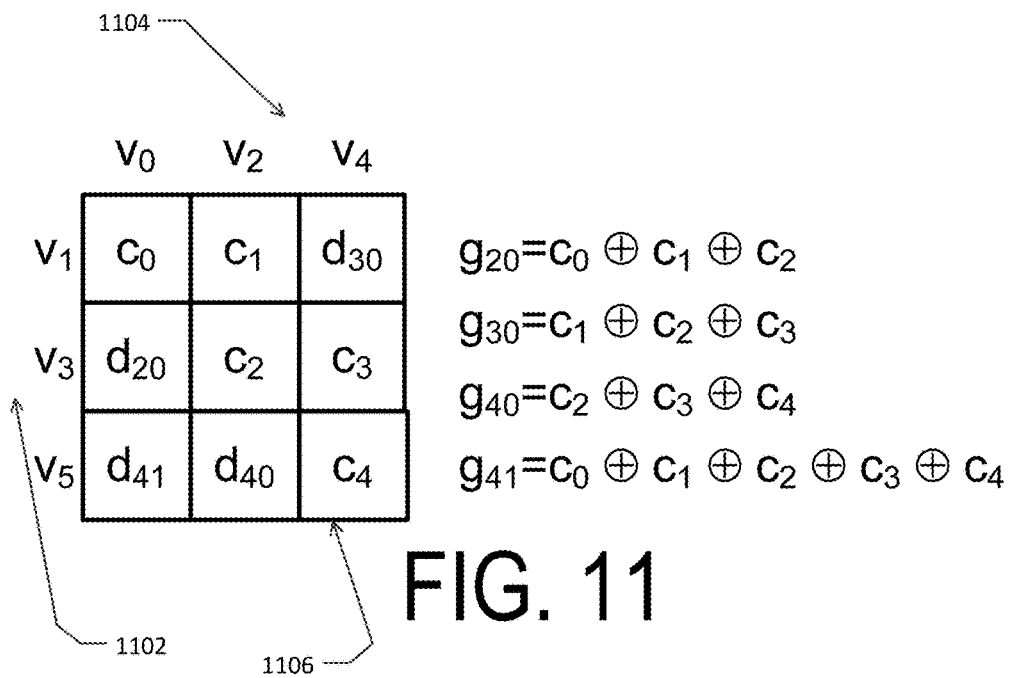
FIG. 11 example of preventing encoding conflicts in a 2-partite system of linear equations.

FIG. 11 shows an example for a prevention of encoding conflicts for 2-partite LSEs. All dependencies in the SLEs based on the dynamic variable are derived based on a matrix which includes a row for each dynamic variable of the first disjoint set, a column for each dynamic variable of the second disjoint set and elements of the matrix contain the value of the corresponding linear equation. Four elements at the intersection of a pair of rows and a pair of columns form a quadruplet. An encoding conflict exists if any quadruplet includes an odd number of 1's. Let us reuse the equations which are defined by Example 2 wherein $\{v_1, v_3, v_5\}$ is the first set 1102 of dynamic variables and $\{v_0, v_2, v_4\}$ is the second set 1104 of dynamic variables. The resultant matrix 1106 has three rows and three columns such that each row and column is uniquely associated with one variable of each disjoint set, respectively. All encoding conflicts can be prevented if the last (fourth) element of each quadruplet is set to a value 0 or 1 such that all the quadruplets always contain an even number of 1's. As a result, values of scan cells in dependent groups $g_{0k}, g_{1k}, \ldots$ can be determined based on the previous care bits $c_0, c_1, \ldots, c_k$. In other words, let all static variables be assigned to a particular value 0 or 1 then the values of all scan cells in a dependent group can be determined based on the relevant dynamic care bits. Therefore, the next care bit is always encodable. In this way, the encoding conflict for the next care bit can be prevented. For example, $c_0, c_1, c_2, c_3$ and $c_4$ are relevant care bits of dependent group $g_{41}$. To prevent encoding conflict, all scan cells in the dependent group are set according to the relevant care bits. For example, a scan cell in dependent group $g_{41}$ is determined based on the following equation: $f(v) = c_0 \oplus c_1 \oplus c_2 \oplus c_3 \oplus c_4$ where $f(v)$ is a characteristic equation of this scan cell. As a result, all linearly dependent scan cells based on the dynamic variables contain an even number of 1s. This embodiment demonstrates that the identification and prevention of encoding conflicts in the 2-partite SLEs is a computationally efficient operation.

A decompressed test stimulus generated by the ADC(N, 4,T) can be viewed as a superposition of a static test sequence based on 2N-bit static seed in registers $R_0$, and $R_1$ and a dynamic test sequence based on 2N-bit dynamic seeds in circular registers $R_2$ and $R_3$ where N is the length of registers and T is a scope of dynamic seeds. Each scan chain is coupled to one bit of registers $R_2$ and $R_3$ therefore the value loaded in each scan cell depends on two dynamic variables. The resultant SLEs is 2-partite. Next, the encoding is decomposed into two independent steps: an initial encoding and a final encoding. The goals of the initial encoding are to identify the encoding conflicts as early as possible during branch-and-bound search and to calculate the static seeds based on the static variables. The goal of the final encoding is to calculate dynamic seeds based on dynamic variables when ATPG is completed. Let each scan cell be uniquely associated with a characteristic equation such that each characteristic equation includes two static variables and two dynamic variables. Let a dynamic equation of a care bit be calculated by substituting all static variables with their values in the corresponding characteristic equation. Therefore each dynamic seed divides the scan cells into $N^2$ groups such that: (i) scan cells in a group depend on the same two dynamic variables; (ii) four groups of a quadruple are linearly dependent; and (iii) each quadruplet includes one dependent group and all other groups are independent.

The initial encoding is based on static variables and includes two phases: unconstrained and constrained. During the unconstrained encoding, each care bit is considered independent and does not imply values of other scan cells. The unconstrained encoding continues until the first encoding conflict or all static variables are assigned to either value 0 or 1. During the constrained encoding, each care bit implies the values of all scan cells in the corresponding group and all dependent groups. As a result, all necessary scan cell assignments are easily identified. This feature is advantageous and improves the efficiency of dynamic pattern compaction. The unconstrained initial encoding is based on the following rules: 1) the first care bit of an independent group is called a dynamic care bit and all other care bits are called static; 2) a relevant bit of an independent group is the first care bit (or the corresponding dynamic care bit); 3) relevant care bits of a dependent group are the first care bits of the corresponding independent groups; and 4) each static care bit and the relevant dynamic care bits are represented in the SLEs by one augmented equation which is calculated as a superposition of their characteristic equations. In this way, the size of the resultant SLEs is greatly reduced because a small subset of care bits (only static care bits) need to be included into the SLEs based on a small subset of variables (static variables). Dependent groups can be calculated using a graph or quadruplets in accordance with previous embodiments.

The final encoding is based on dynamic variables and includes the following steps: 1) determine a dynamic equation of each dynamic care bit by substituting all static variables with the values assigned during the initial encoding; 2) for T consecutive shift cycles, encode all dynamic care bits with available 2N dynamic variables where T is the scope of dynamic seeds and N is the length of circular registers.

Example 4

Figure 12:
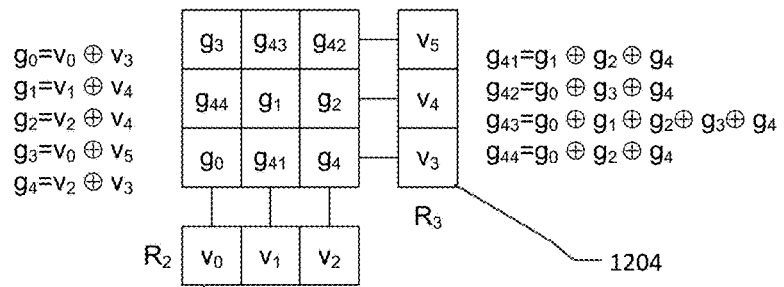
FIG. 12 shows an example initial encoding of augmented decompressor.

FIG. 12 illustrates an initial encoding of the ADC(N,4,T) for N=3 and T≤N in accordance with some embodiments described herein. For simplicity, let scan chains of a CUT have length of T where T is the scope of dynamic seeds. First, scan cells are divided into 9 groups such that each group is associated with two dynamic variables. Let a set of care bits $\{c_0, c_1, \ldots, c_4\}$ belong to five different groups $\{g_0, g_1, \ldots, g_4\}$ such that the index determines an order of these care bits during ATPG. The left-hand side in FIG. 12 shows the dynamic equations of groups $g_0, g_1, \ldots, g_4$ that are valid for all scan cells in the corresponding group. Note that the dynamic equations of groups $g_0, g_1, \ldots, g_4$ are linearly independent. As a result, each one of these care bits can be uniquely associated with one dynamic variable (a pivot element) of circular registers $R_2$ 1202 and $R_3$ 1204. Next, four groups located at the intersection of a pair of rows and a pair of columns are linearly dependent and form a quadruplet. An encoding conflict exists if and only if a set of linearly dependent groups contains an odd number of 1's. To avoid encoding conflicts, the dynamic equation of the last group of a quadruplet is calculated as a superposition of the dynamic equations of the previous three groups. To illustrate this, the dependent groups of group $g_{4j}$ are labeled as $g_{4j}$ for $j=(0, 1, \ldots, 4)$. Let the characteristic equations of care bit $c_i$ be $f_i(v)=c_i$ for $i=(0, 1, \ldots, 7)$. Also, let care bit $c_5$ be the second care bit in group $g_0$ and care bits $c_6$ and $c_7$ be the first and second care bits in dependent group $g_{44}$, respectively. Care bits $c_5, c_6$ and $c_7$ are static and they need to be included in the SLEs. An augmented equation of care bit $c_5$ is $f_0(v) \oplus f_5(v) = c_0 \oplus c_5$. The augmented equation of care bit $c_6$ is $f_0(v) \oplus f_2(v) \oplus f_4(v) \oplus f_6(v) = c_0 \oplus c_2 \oplus c_4 \oplus c_6$. More formally, $c_6$ is the first care bit of dependent group $g_{44}$ of quadruplet $g_0$, $g_2, g_4$, and $g_{44}$. Therefore, to avoid encoding conflict, the augmented equation of $c_6$ is calculated as a superposition of the characteristic equations of $c_6$ and the first care bit of groups $g_0$, $g_2$ and $g_4$, respectively. Similarly, the augmented equation of care bit $c_7$ is $f_0(v) \oplus f_2(v) \oplus f_4(v) \oplus f_7(v) = c_0 \oplus c_2 \oplus c_4 \oplus c_7$. Note that all augmented equations include only static variables because dynamic equations of each static care bit and its relevant dynamic care bit(s) are linearly dependent. Next, the dynamic equations of dynamic care bits are calculated by a substitution of all static variables in their characteristic equations $f_0(v)=c_0$, $f_1(v)=c_1$, ..., $f_4(v)=c_4$. During the final encoding, all dynamic care bits within the scope of a dynamic seed form a SLEs which includes one equation for each dynamic care bit. The resultant SLEs includes 2N dynamic variables and up to 2N−1 equations per dynamic seed.

Power-Aware Dynamic Encoding

Let ADC(N, 4, T) be constructed based on Procedure 1 and include registers $R_0$, $R_1$, $R_2$ and $R_3$ where N is the length of registers and T is scope of dynamic seeds. The ADC(N, 4, T) comprises a static test stimulus source including registers $R_0$ and $R_1$ and a dynamic test stimulus source including registers $R_2$ and $R_3$. Toggling in the decompressed test stimulus of the ADC(N,4,T) is minimized if dynamic variables are enabled for fewer scan cells. The proposed power-aware dynamic encoding is based on dividing scan cells in power-aware groups such that the dynamic variables are selectively enabled for a subset of power-aware groups. In contrast to the dynamic encoding, the power-aware dynamic encoding first tries to encode each care bit based on the static variables. If this step produces an encoding conflict for a care bit then the power-aware dynamic encoding enables the corresponding power-aware group. As a result, the linear equations of all care bits in this power-group include both two static variables and two dynamic variables. In other words, the linear equations of scan cells in enabled power-aware groups includes both static and dynamic variables and the linear equations of scan cells in disabled power-aware groups includes static variables only. The resultant 2-partite SLEs is processed based on the principles described in the previous embodiments. More formally, dynamic variables divide care bits in selected power-aware groups into groups of scan cells. The SLEs is updated such that (i) each care bit in the unselected power-aware groups is included in the SLE based on a static equation which is calculated by removing dynamic variables in the corresponding characteristic equation; (ii) all care bits in the selected power-aware groups need to be encoded based on their characteristic equations. Accordingly, the first care bits in an independent group of scan cells are considered dynamic and excluded from the SLEs while all remaining care bits in the selected power-aware groups are considered static and need to be included into the SLEs using their augmented equations as described in Example 4. In this way, the original SLEs is partitioned into SLEs based on static variables and SLEs based on dynamic variables. The unconstrained encoding continues until the number of the enabled power-aware groups is smaller than a specified limit and all static variables are assigned to a specific value. Encoding conflicts in the SLEs based on dynamic variables can be easily identified using a graph in accordance with the previous embodiments. During constrained encoding, all necessary scan cell assignments can be easily derived by SLEs based on dynamic variables using quadruplets for each successfully generated test cube. The static test stimulus is enabled for all scan cells while the dynamic test stimulus is enabled for a subset of power-aware groups. As a result, toggling in decompressed test stimulus may appear only in enabled power-aware groups.

Example 5

FIG. 14 shows four scan chains, the corresponding triplets (x,y,z) 1402 of each scan chain which are coupled to the power-aware ADC(3,4) and an ordered set of care bits $c_0$, $c_1$, ..., $c_4$ as they are generated during ATPG. Let each of the scan chains under consideration belong to different power-aware group. The goal of the power-aware dynamic encoding is to enable as few power-aware groups as possible. The original SLEs 1502 is shown in FIG. 15 and includes a row for each care bit and column for each variable. Note that each row of the SLEs corresponds to a care bit and is specified by a characteristic equation of the corresponding scan cell (including both static and dynamic variables) as well as the value assigned to this scan cell during ATPG. Next, each care bit is initially included in SLEs based on static variables. In this way, all power-aware groups are initially disabled. An encoding conflict exists for care bits $c_3$ and to resolve this conflict the corresponding power-aware group is enabled. The enabled power-aware group includes care bits $c_1$ and $c_3$. Since care bits $c_1$ and $c_3$ are the first care bits in the corresponding groups of scan cells they are treated as dynamic care bits. The corresponding rows of care bits $c_1$ and $c_3$ are removed from the SLEs based on static variables and included into the SLEs based on dynamic variables. FIG. 16 shows the resultant SLEs for calculating static seed and the resultant SLEs for calculating dynamic seed where $v_0$, $v_1$, ..., $v_5$ are static variables 1602 and $v_6$, $v_7$, ..., $v_{11}$ are dynamic variables 1604, respectively. The size of each SLEs is 2N where N is the length of each register of the power-aware ADC(N,4). One of the possible solutions is $v_0=1$, $v_7=1$, $v_8=1$ and all other variables are equal to 0. FIG. 17 shows the resultant static test stimulus and dynamic test stimulus for this assignment of static and dynamic variables as well as the corresponding decompressed test stimulus which is calculated based on a superposition (XOR operation) of individual test bits. Toggling in the decompressed test stimulus is greatly reduced compare to the original dynamic encoding based on the original ADC scheme.

A person skilled of the art may improve the encoding flexibility, the encoding efficiency or other desirable properties of the decompressor scheme by changing the scope or purpose of variables from a tester. For example, one or more dynamic variables may be used or reused as static variables or control variables within one or more test patterns. An example of such an approach is described in the next paragraph.

Experimental Evaluation

Figure 13:
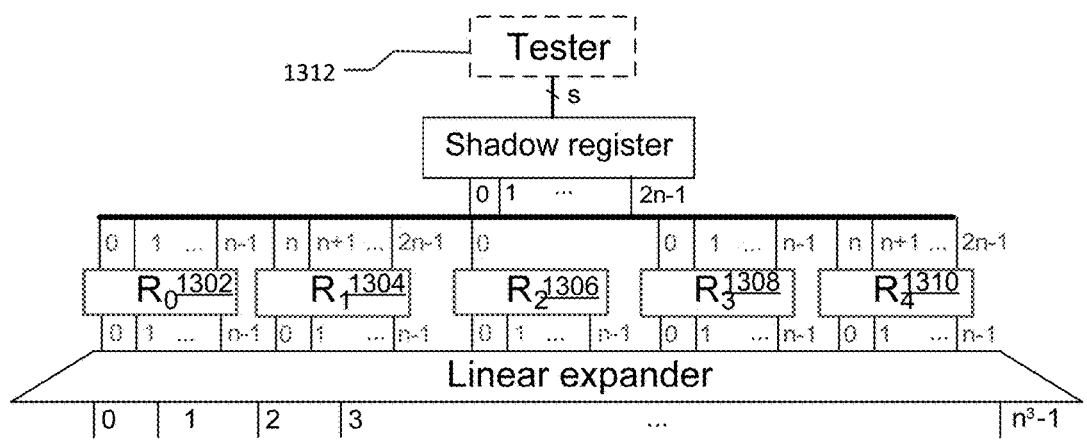
FIG. 13 shows an example interface of an augmented decompressor with a tester.

Dynamic encoding was evaluated based on ADC(N,5,T). The ADC(N,5,T) consists of five shift registers of length N. Shift registers $R_0$ 1302, $R_1$ 1304, $R_2$ 1306, $R_3$ 1308 and $R_4$ 1310 are configured as circular registers. Circular registers $R_0$ 1302 and $R_1$ 1304 receive 2N-bit static seed per pattern and circular registers $R_3$ 1308 and $R_4$ 1310 receive 2N-bit dynamic seed per T shift cycles through 2N-bit shadow register where T≤N. Each seed contains one redundant bit that is shifted into shift register $R_2$ 1306 and all the redundant bits are treated as static variables by the encoding algorithm. FIG. 13 shows an interface of the ADC to a tester 1312. The embodiment shows that one or more dynamic variables may be used or reused as either static variables or control variables in order to improve the encoding flexibility or other characteristic of the decompressor scheme. Since the limited scope of the dynamic variables reduces the encoding efficiency of the ADC. The key question examined here is whether dynamic encoding can compensate for the higher encoding efficiency of static encoding.

In the performed experiment, the dynamic and static encoding are evaluated based on ten industrial cores presented in Table 1 as depicted in FIG. 18. First, the highest compression ratio for each core is determined such that a test coverage loss w.r.t. a legacy scan mode is within 0.01 percent. The number of the static and dynamic variables, the encoding efficiency, TATR, the number of patterns and test coverage difference w.r.t. the legacy scan mode of the ADC for each core is given in columns 5, 6, . . . and 10, respectively. A perfect linear decompressor is simulated by ADC(15,5,1) which receives 2N-bit dynamic seed per shift cycle. In this way, the probability of an encoding conflict of the perfect decompressor for the first k care bits is extremely low where k is the number of variables for the ADC(15,5,15). After the first k care bits for the perfect linear decompressor, each care bit is considered encodable with probability 0.5. As a result, the encoding efficiency of the perfect decompressor is very likely be equal to or larger than 1. TATR for the static and dynamic encoding is determined for different compression ratios (1×, 2×, 3× and 4× more variables w.r.t. the highest compression ratio). For the static encoding, an encoding conflict exists if a test cube cannot be encoded. Typically, this is an exit condition for fault merging that occurs during dynamic compaction. Table 2 as depicted in FIG. 19 summarizes for all cores the number variables, the encoding efficiency, TATR for the dynamic encoding, as well as TATR and test coverage differences in percent w.r.t. legacy scan mode for dynamic encoding and the static encoding with 1, 10 and 100 encoding conflicts, respectively. Based on these results, the dynamic encoding outperforms the static encoding for all compression ratios. For compression ratio 1×, 2×, 3× and 4×, the dynamic encoding achieves 34, 17, 8 and 5 percent higher TATR than the static encoding, respectively. Also, the dynamic encoding consistently achieves higher test coverage than the static encoding. For more than two decades, the key objective for synthesis of linear decompressors is to maximize the encoding efficiency. This experiment demonstrates that the dynamic encoding is a key feature for optimizing the performance of the linear decompressors. In this sense, this document defines a new paradigm for synthesis of linear decompressors.

Dynamic power-aware encoding is evaluated based on the ADC(15,4,15) constructed based on Procedure 1. The experimental results confirmed that, for example, seventy percent reduction in the toggling rate in the decompressed test stimulus is achievable by reasonable overhead (ATPG time, hardware overhead and pattern inflation) typically without degradation of compression ratio. The performed experimental evaluation confirms that the described embodiments can support aggressive scan compression, efficient dynamic pattern compaction and a reduction of toggling rate in the decompressed test stimulus.

Figure 20:
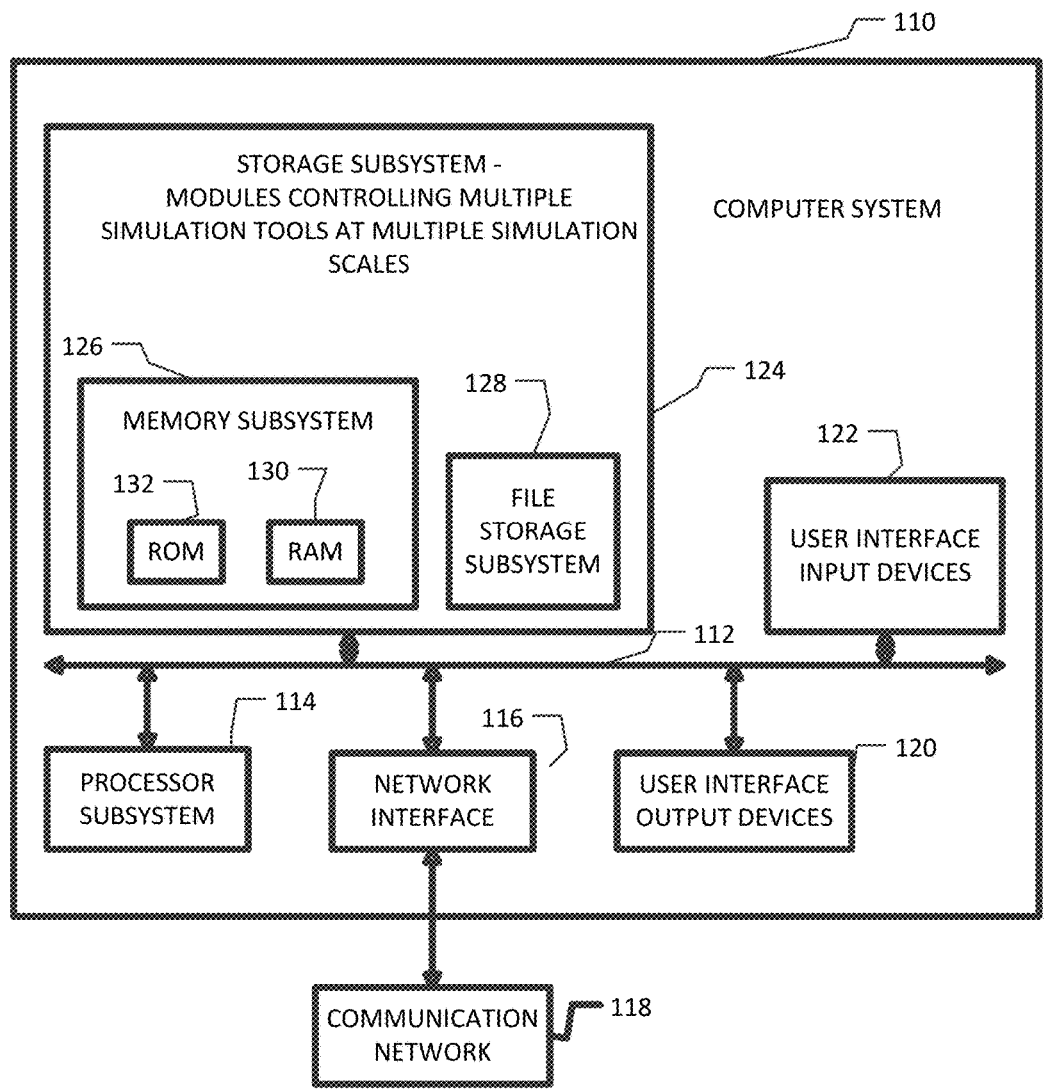
FIG. 20 is a simplified block diagram of a computer system configured to run an EDA tool.

FIG. 20 is a simplified block diagram of a computer system configured to run an EDA tool to implement any of the methods and processes herein.

Computer system 110 typically includes a processor subsystem 114 which communicates with a number of peripheral devices via bus subsystem 112. These peripheral devices may include a storage subsystem 124, comprising a memory subsystem 126 and a file storage subsystem 128, user interface input devices 122, user interface output devices 120, and a network interface subsystem 116. The storage subsystem 128 includes non-transitory memory storing computer programs, and resources to configure the data processing systems as an EDA tool for test pattern generation, encoding, simulation, fault simulation and diagnosis for decompressed test stimuli with low toggling rate as described herein. The tool can comprise a data processor and storage configured to provide computer program instructions of the tool. Alternatively, the tool can comprise software modules on a computer readable medium in a nonvolatile manner.

The input and output devices allow user interaction with computer system 110. Network interface subsystem 116 provides an interface to outside networks, including an interface to communication network 118, and is coupled via communication network 118 to corresponding interface devices in other computer systems. Communication network 118 may comprise many interconnected computer systems and communication links. These communication links may be wireline links, optical links, wireless links, or any other mechanisms for communication of information, but typically it is an IP-based communication network. While in one embodiment, communication network 118 is the Internet, in other embodiments, communication network 118 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 122 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 110 to the user or to another machine or computer system.

Storage subsystem 124 stores the basic programming and data constructs that provide the functionality of certain embodiments. For example, the various modules implementing the functionality of certain embodiments may be stored in storage subsystem 124. These software modules are generally executed by processor subsystem 114.

Memory subsystem 126 typically includes a number of memories including a main random access memory (RAM) 130 for storage of instructions and data during program execution and a read only memory (ROM) 132 in which fixed instructions are stored. File storage subsystem 128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 128. The host memory 126 contains, among other things, computer instructions which, when executed by the processor subsystem 114, cause the computer system to operate or perform functions as described herein. As used herein, processes and software that are said to run in or on "the host" or "the computer", execute on the processor subsystem 114 in response to computer instructions and data in the host memory subsystem 126 including any other local or remote storage for such instructions and data.

Bus subsystem 112 provides a mechanism for letting the various components and subsystems of computer system 110 communicate with each other as intended. Although bus subsystem 112 is shown schematically as a single bus, alternative embodiments of the bus subsystem may use multiple busses.

Computer system 110 itself can be of varying types including a personal computer, a portable computer, a workstation, a computer terminal, a network computer, a television, a mainframe, a server farm, or any other data processing system or user device. Due to the ever changing nature of computers and networks, the description of computer system 110 is intended only as a specific example for purposes of illustrating the preferred embodiments of the present invention. Many other configurations of computer system 110 are possible having more or less components than the computer system.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Figure 21:
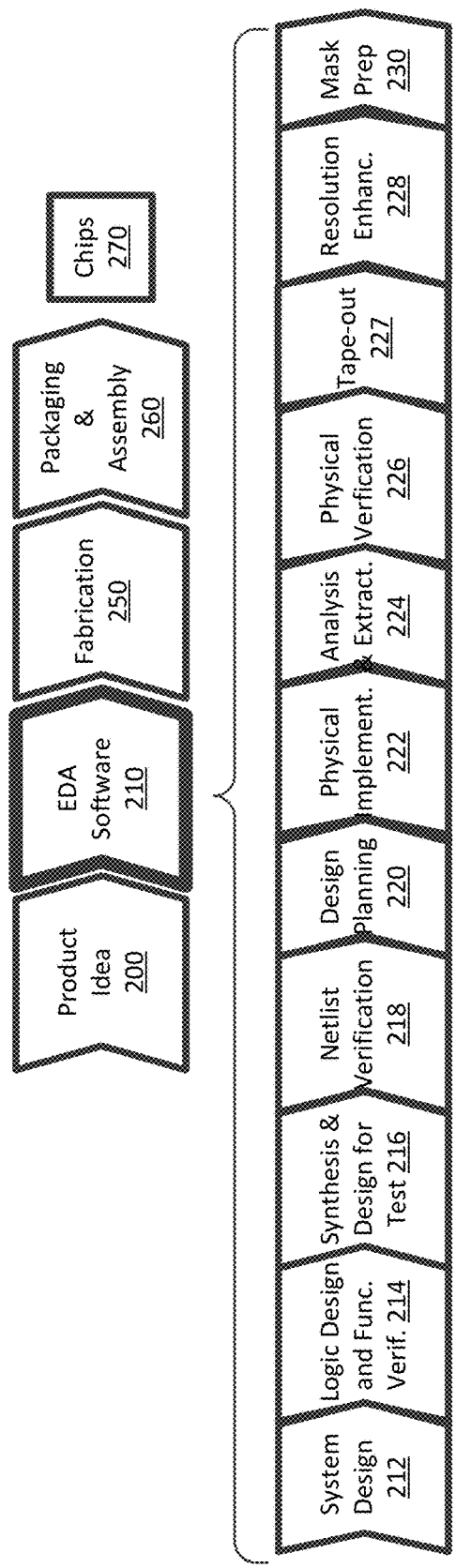
FIG. 21 illustrates EDA tools and process flow for integrated circuit design and manufacturing.

FIG. 21 illustrates EDA tools and process flow for integrated circuit design and manufacturing.

Aspects of the invention can be used to support an integrated circuit design flow. At a high level, the process starts with the product idea (step 200) and is realized in an EDA (Electronic Design Automation) software design process (step 210). When the design is finalized, it can be taped-out (step 227). At some point after tape out, the fabrication process (step 250) and packaging and assembly processes (step 260) occur resulting, ultimately, in finished integrated circuit chips (result 270).

The EDA software design process (step 210) is itself composed of a number of steps 212-230, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 210) will now be provided.

System design (step 212): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 214): At this stage, the VHDL or Verilog code for modules in the system is written and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test (step 216): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMA1, and DesignWare® products.

Netlist verification (step 218): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 220): Here, an overall floor plan for the chip is constructed and analyzed for timing and top-level routing. Example EDA software products from Synopsys, Inc. that can be used at this step include Astro and Custom Designer products.

Physical implementation (step 222): The placement (positioning of circuit elements) and routing (connection of the same) occurs at this step, as can selection of library cells to perform specified logic functions. Example EDA software products from Synopsys, Inc. that can be used at this step include the Astro, IC Compiler, and Custom Designer products.

Analysis and extraction (step 224): At this step, the circuit function is verified at a transistor level, this in turn permits what-if refinement. Example EDA software products from Synopsys, Inc. that can be used at this step include AstroRail, PrimeRail, PrimeTime, and Star-RC1T products.

Physical verification (step 226): At this step various checking functions are performed to ensure correctness for: manufacturing, electrical issues, lithographic issues, and circuitry. Example EDA software products from Synopsys, Inc. that can be used at this step include the Hercules product.

Tape-out (step 227): This step provides the "tape out" data to be used (after lithographic enhancements are applied if appropriate) for production of masks for lithographic use to produce finished chips. Example EDA software products from Synopsys, Inc. that can be used at this step include the IC Compiler and Custom Designer families of products.

Resolution enhancement (step 228): This step involves geometric manipulations of the layout to improve manufacturability of the design. Example EDA software products from Synopsys, Inc. that can be used at this step include Proteus, ProteusAF, and PSMGen products.

Mask data preparation (step 230): This step provides mask-making-ready "tape-out" data for production of masks for lithographic use to produce finished chips. Example EDA software products from Synopsys, Inc. that can be used at this step include the CATS® family of products.

Parallel flow. The integrated circuit manufacturing flow includes a parallel flow, as follows:

(1) Develop individual process steps for manufacturing the integrated circuit. This can be modeled with EDA tools such as the Synopsys tools "Sentaurus Process", "Sentaurus Topography", and "Sentaurus Lithography". The input information here is the process conditions like temperature, reactor ambient, implant energy, etc. The output information is the change in geometry or doping profiles or stress distribution.

(2) Integrate the individual process steps into the complete process flow. This can be modeled with EDA tools such as the Synopsys tool "Sentaurus Process". The input information here is the collection of the process steps in the appropriate sequence. The output is the geometry, the doping profiles, and the stress distribution for the transistors and the space in between the transistors.

(3) Analyze performance of the transistor manufactured with this process flow. This can be done with EDA tools such as the Synopsys tool "Sentaurus Device". The input information here is the output of step (3) and the biases applied to transistor terminals. The output information is the currents and capacitances for each bias combination. For silicon based processes or structures, much of the information about the materials needed for simulation of electrical behavior using these tools is well known. For other materials, it may be necessary to generate or provide material parameters like atomic structure, energy, and the like in order to support device and process scale simulations. An EDA tool for generating parameters like this is described herein.

(4) If necessary, modify the process steps and the process flow to achieve the desired transistor performance. This can be done iteratively by using tools such as the Synopsys tools mentioned above.

Once the process flow is ready, it can be used for manufacturing multiple circuit designs coming from different fabless companies. The EDA flow 212-230 will be used by such fabless companies. The parallel flow described here is used at a foundry to develop a process flow that can be used to manufacture designs coming from their fabless customers. A combination of the process flow and the masks 230 are used to manufacture any particular circuit. If the integrated circuit is manufactured at an IDM (integrated device manufacturer) company instead of the combination of a fables company and a foundry, then both parallel flows described above are done at the same IDM company.

The invention claimed is:

1. An EDA tool for transforming a circuit design of an integrated circuit to include design-for-test circuitry, comprising:
   a memory; and
   a data processor coupled to the memory, the memory containing software code portions which, when executed by the data processor, define the integrated circuit including a plurality of groups of scan chains and the design-for-test circuitry, the design-for-test circuitry including:
      a static test stimulus source of static test stimulus values;
      a dynamic test stimulus source of dynamic test stimulus values;
      a programmable controller generating a plurality of selection control signals, the plurality of selection control signal designating for dynamic testing a first proper, non-null subset of the groups of scan chains in the integrated circuit;
      a decompressor receiving the plurality of selection control signals and generating decompressed test stimuli in dependence upon the static test stimulus values for all of the groups of scan chains not in the first subset of scan chains, and generating the decompressed test stimuli in further dependence upon the dynamic test stimulus values for the groups of scan chains in the first subset of scan chains; and
      circuitry loading the decompressed test stimuli into the plurality of groups of scan chains in the integrated circuit.

2. The EDA tool of claim 1, wherein the plurality of selection control signals is based on a grouping mechanism.

3. The EDA tool of claim 1, wherein the dynamic test stimulus source includes a circular register such that at least one bit of said circular register is coupled to each scan chain in the integrated circuit.

4. The EDA tool of claim 1, wherein the dynamic test stimulus source includes two circular registers such that each scan chain in the integrated circuit is coupled to each of said two circular registers.

5. The EDA tool of claim 1, wherein the decompressed test stimuli is generated based on a superposition of the static test stimulus source and the dynamic test stimulus source.

6. The EDA tool of claim 1, wherein the static test stimulus source generates same test data bits for two or more consecutive shift cycles.

7. An EDA tool for transforming a circuit design of an integrated circuit to include design-for-test circuitry, comprising:
   a memory; and
   a data processor coupled to the memory, the memory containing software code portions which, when executed by the data processor, define the integrated circuit including a plurality of scan chains and the design-for-test circuitry, the design-for-test circuitry including:
      a first disjoint set of static variables;
      a second disjoint set of dynamic variables;
      a programmable controller generating a plurality of selection control signals, the plurality of selection control signal designating for dynamic testing a first proper, non-null subset of the groups of scan chains in the integrated circuit;
      a decompressor receiving the plurality of selection control signals and generating decompressed test stimuli including generating care bits in dependence upon the first disjoint set of static variables for all of the groups of scan chains not in the first subset of scan chains, and generating care bits in further dependence upon the second disjoint set of dynamic variables for the groups of scan chains in the first subset of scan chains; and
      circuitry loading the decompressed test stimuli into the plurality of scan chains in the integrated circuit.

8. The EDA tool of claim 7, wherein the plurality of selection control signals is based on a grouping mechanism.

9. The EDA tool of claim 7, wherein the variables of said second disjoint set of dynamic variables are loaded into a dynamic test stimulus source.

10. The EDA tool of claim 9, wherein the dynamic test stimulus source includes a circular register such that at least one bit of said circular register is coupled to each scan chain in the integrated circuit.

11. The EDA tool of claim 9, wherein the dynamic test stimulus source includes two circular registers such that each scan chain in the integrated circuit is coupled to each of said two circular registers.

12. An EDA tool for transforming a circuit design of an integrated circuit, comprising:
- a memory; and
- a data processor coupled to the memory, the memory containing software code portions which, when executed by the data processor, define the integrated circuit including a plurality of scan chains and the design-for-test circuitry, the design-for-test circuitry including:
  - at least one variable of a first disjoint set of static variables;
  - at least one variable of a second disjoint set of dynamic variables;
  - a programmable controller generating a plurality of selection control signals, the plurality of selection control signal designating for dynamic testing a first proper, non-null subset of the groups of scan chains in the integrated circuit;
  - a decompressor receiving the plurality of selection control signals and generating decompressed test stimuli in dependence upon at least one variable of the first disjoint set of static variables for all of the groups of scan chains not in the first subset of scan chains, and generating the decompressed test stimuli in further dependence upon at least one variable of the second disjoint set of dynamic variables for the groups of scan chains in the first subset of scan chains; and
  - circuitry loading the decompressed test stimuli into the plurality of scan chains in the integrated circuit.

13. The EDA tool of claim 12, wherein the decompressed test stimuli includes care bits for detecting faults in the plurality of groups of scan chains, wherein the plurality of selection control signals is based on a grouping mechanism.

14. The EDA tool of claim 12, wherein the at least one variable of said second disjoint set of dynamic variables is loaded into a dynamic test stimuli source.

15. The EDA tool of claim 14, wherein the second disjoint set of dynamic variables includes a circular register such that at least one bit of said circular register is coupled to each scan chain in the integrated circuit.

16. The EDA tool of claim 14, wherein the second disjoint set of dynamic variables includes two circular registers such that each scan chain in the integrated circuit is coupled to each of said two circular registers.

* * * * *